US011269317B2

(12) United States Patent
Kubo et al.

(10) Patent No.: US 11,269,317 B2
(45) Date of Patent: Mar. 8, 2022

(54) SYSTEM AND METHOD FOR SUPPORTING PRODUCTION MANAGEMENT

(71) Applicant: HITACHI, LTD., Tokyo (JP)

(72) Inventors: Shigeyasu Kubo, Tokyo (JP); Yusuke Yajima, Tokyo (JP); Kenichirou Kawakami, Tokyo (JP); Kazuhiro Matsuya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 132 days.

(21) Appl. No.: 16/808,470

(22) Filed: Mar. 4, 2020

(65) Prior Publication Data

US 2020/0363792 A1 Nov. 19, 2020

(30) Foreign Application Priority Data

May 17, 2019 (JP) .............................. JP2019-094135

(51) Int. Cl.
*G05B 19/418* (2006.01)

(52) U.S. Cl.
CPC ................ *G05B 19/41865* (2013.01); *G05B 2219/32128* (2013.01); *G05B 2219/32423* (2013.01)

(58) Field of Classification Search
CPC ............ G06T 11/206; G05B 19/41865; G05B 2219/32128
See application file for complete search history.

(56) References Cited

U.S. PATENT DOCUMENTS

| 6,594,535 B1* | 7/2003 | Costanza ......... G05B 19/41865 700/97 |
| 10,540,626 B2* | 1/2020 | Takahashi .......... G06Q 10/0639 |
| 10,861,201 B2* | 12/2020 | Kuroda .................... G09G 5/00 |
| 10,861,203 B1* | 12/2020 | Cervelli ............... G06T 11/206 |
| 2012/0253869 A1* | 10/2012 | Ansley ................... G06Q 10/06 705/7.12 |
| 2015/0081263 A1* | 3/2015 | Nagahara ................ G06F 30/20 703/7 |
| 2015/0097840 A1 | 4/2015 | Nishimura et al. |
| 2016/0284109 A1* | 9/2016 | Nishimura ............ G06T 11/206 |
| 2017/0193131 A1* | 7/2017 | Seo .................... G05B 19/4184 |
| 2018/0101294 A1* | 4/2018 | Kuroda ............... G06F 3/04847 |
| 2018/0191988 A1* | 7/2018 | Takahashi .............. G06Q 10/06 |
| 2018/0253874 A1* | 9/2018 | Nomamoto ............ G06Q 10/06 |

(Continued)

FOREIGN PATENT DOCUMENTS

| JP | 6287018 B2 | 3/2018 |
| WO | 2019/064892 A1 | 4/2019 |

*Primary Examiner* — Justin S Lee
(74) *Attorney, Agent, or Firm* — Volpe Koenig

(57) ABSTRACT

A support system displays, on the basis of management information as a past record which shows, for each product loaded in a production system in which a plurality of different models of products are loaded and a sequential order of two or more of a plurality of steps is different depending on the model, an execution time of each of the steps, at least one of a first holistic chart (having a time axis and showing a feature value of production situation of the product during a display target period on a per predetermined unit basis) and a second holistic chart (showing a relationship between a plurality of steps with respect to a flow of a plurality of models of products). The support system selects at least one of a model and a step for one of the holistic charts, and displays step element information.

9 Claims, 17 Drawing Sheets

(56) References Cited

U.S. PATENT DOCUMENTS

| | | | |
|---|---|---|---|
| 2018/0268580 A1* | 9/2018 | Nomamoto | G05B 19/418 |
| 2018/0329400 A1* | 11/2018 | Oohori | H05K 13/021 |
| 2018/0350000 A1* | 12/2018 | Asllan | G06Q 40/04 |
| 2019/0026928 A1* | 1/2019 | Fainshtein | G06T 3/60 |
| 2020/0167691 A1* | 5/2020 | Golovin | G06N 7/005 |
| 2020/0184692 A1* | 6/2020 | Yang | G06T 11/206 |

* cited by examiner

FIG.4

STEP PAST RECORD TABLE
351

| STEP ID | DATE/TIME | PRODUCT ID | DATE/TIME STATUS |
|---|---|---|---|
| 1 | 2018-06-01 12:00:00 | 0011 | START |
| 1 | 2018-06-01 15:00:00 | 0011 | DONE |
| 3 | 2018-06-01 18:00:00 | 0012 | 開始 |
| 3 | 2018-06-01 21:00:00 | 0012 | 完了 |
| 2 | 2018-06-02 00:00:00 | 0011 | 開始 |
| 2 | 2018-06-02 03:00:00 | 0011 | 完了 |
| 4 | 2018-06-02 06:00:00 | 0011 | 開始 |
| … | … | … | … |

RETENTION NUMBER TABLE
352

| 2018/6/3 | … | 13:27 | 13:28 | 13:29 | 13:30 | 13:31 | 13:32 | … |
|---|---|---|---|---|---|---|---|---|
| IN STEP 1 | … | 4 | 3 | 2 | 1 | 1 | 1 | … |
| BETWEEN STEPS 1 AND 2 | … | 0 | 1 | 2 | 2 | 2 | 2 | … |
| IN STEP 2 | … | … | … | 0 | 1 | 2 | 2 | … |
| BETWEEN STEPS 2 AND 3 | … | … | … | … | 0 | 0 | 0 | … |
| … | … | … | … | … | … | … | … | … |

FIG.6

ORDER-OF-STEP TABLE
353

| MODEL ID (601) | PRODUCT ID (602) | ORDER OF STEPS (603) | STANDARD TIME (604) | STANDARD LEAD TIME (sec) (605) |
|---|---|---|---|---|
| X | 0011, … | 1,2,3,4 | 3600,3600,3600, 3600 | 25200 |
| Y | 0012, … | 1,2,4 | 3600,3600,3600 | 18000 |
| Z | 0501, … | 1,3,4 | 3600,3600,3600 | 18000 |
| W | 0201,… | 3,1,4 | 3600,3600,3600 | 18000 |

FIG.7

FACILITY PAST RECORD TABLE
354

| FACILITY ID (701) | DATE/TIME (702) | PRODUCT ID (703) | STEP ID (704) | MODEL ID (705) | FACILITY STATUS (706) | DATE/TIME STATUS (707) |
|---|---|---|---|---|---|---|
| FACILITY5 | 2018-06-01 18:00:00 | 0011 | 4 | X | IN OPERATION | START |
| FACILITY5 | 2018-06-01 21:00:00 | 0011 | 4 | X | IN OPERATION | DONE |
| FACILITY6 | 2018-06-02 00:00:00 |  | 4 | X | IN SETUP CHANGE | START |
| FACILITY6 | 2018-06-02 03:00:00 |  | 4 | X | IN SETUP CHANGE | DONE |
| FACILITY6 | 2018-06-02 06:00:00 | 0011 | 4 | X | IN OPERATION | START |
| FACILITY6 | 2018-06-02 09:30:00 | 0011 | 4 | X | ABNORMAL | START |
| FACILITY6 | 2018-06-02 12:00:00 | 0011 | 4 | X | ABNORMAL | DONE |
| … | … | … | … | … | … | … |

ORDER-OF-FACILITY TABLE
355

| STEP ID | ORDER OF FACILITIES | FACILITY STANDARD LEAD TIME | PARTIAL STANDARD LEAD TIME |
|---|---|---|---|
| 1 | FACILITY1, FACILITY2 | 900,900 | 3600 |
| 2 | FACILITY3, FACILITY4 | 900,900 | 3600 |
| 4 | FACILITY5, FACILITY6 | 900,900 | 3600 |
| ... | ... | ... | ... |

SYSTEM AND METHOD FOR SUPPORTING PRODUCTION MANAGEMENT

CROSS-REFERENCE TO PRIOR APPLICATION

This application relates to and claims the benefit of priority from Japanese Patent Application number 2019-094135, filed on May 17, 2019 the entire disclosure of which is incorporated herein by reference.

BACKGROUND

The present invention relates generally to a computer technique for supporting production management.

As a technique for supporting production management, the technique disclosed in Reference 1 is known. The technique disclosed in Reference 1 visually recognizably displays a production period and a wait period for each step.
Reference 1: Japanese Patent No. 6287018

SUMMARY

According to the visualization technique of Reference 1, production management of a production system for one specific sequential order of steps, that is, a line production system is possible.

However, it is hard for the visualization technique of Reference 1 to support production management in such a production system that a plurality of different models of products (parts or materials serving as a base of a finished product) are loaded and the sequential order of two or more of steps is different depending on the model (e.g., a production system in which two or more sequential orders of steps sharing some steps are mixed).

A supporting system displays, on the basis of management information including information as a past record which shows, for each product loaded in a production system in which a plurality of different models of products are loaded and a sequential order of two or more of a plurality of steps is different depending on the model, an execution time of each of the steps, at least one of a first holistic chart and a second holistic chart. The first holistic chart is a user interface which has a time axis that is an axis corresponding to time and a step axis that is an axis perpendicular to the time axis and corresponding to steps and in which display objects that each show a feature value of production situation of a product during a display target period on a per predetermined unit basis are arranged. The second holistic chart is a user interface which shows a relationship between the plurality of steps with respect to a flow of the plurality of different models of products and in which display objects for respective steps and display objects for respective inter-step ranges are arranged. In both the first holistic chart and the second holistic chart, a display object corresponding to a feature value satisfying a condition is subjected to accentuated display. The supporting system selects at least one of a model and a step for one of the first holistic chart and the second holistic chart, and displays, on the basis of the management information, step element information including at least one of information related to one or more step elements of one or more steps belonging to the selected model and information related to one or more step elements of the selected one or more steps.

It is possible to support production management of a production system in which a plurality of different models of products are loaded and the sequential order of two or more of a plurality of steps is different depending on the model.

BRIEF DESCRIPTION OF THE DRAWINGS

FIG. 4 shows an example of a step past record table;
FIG. 5 shows an example of a retention number table;
FIG. 6 shows an example of an order-of-step table;
FIG. 7 shows an example of a facility past record table.

DESCRIPTION OF EMBODIMENTS

Figure 1:
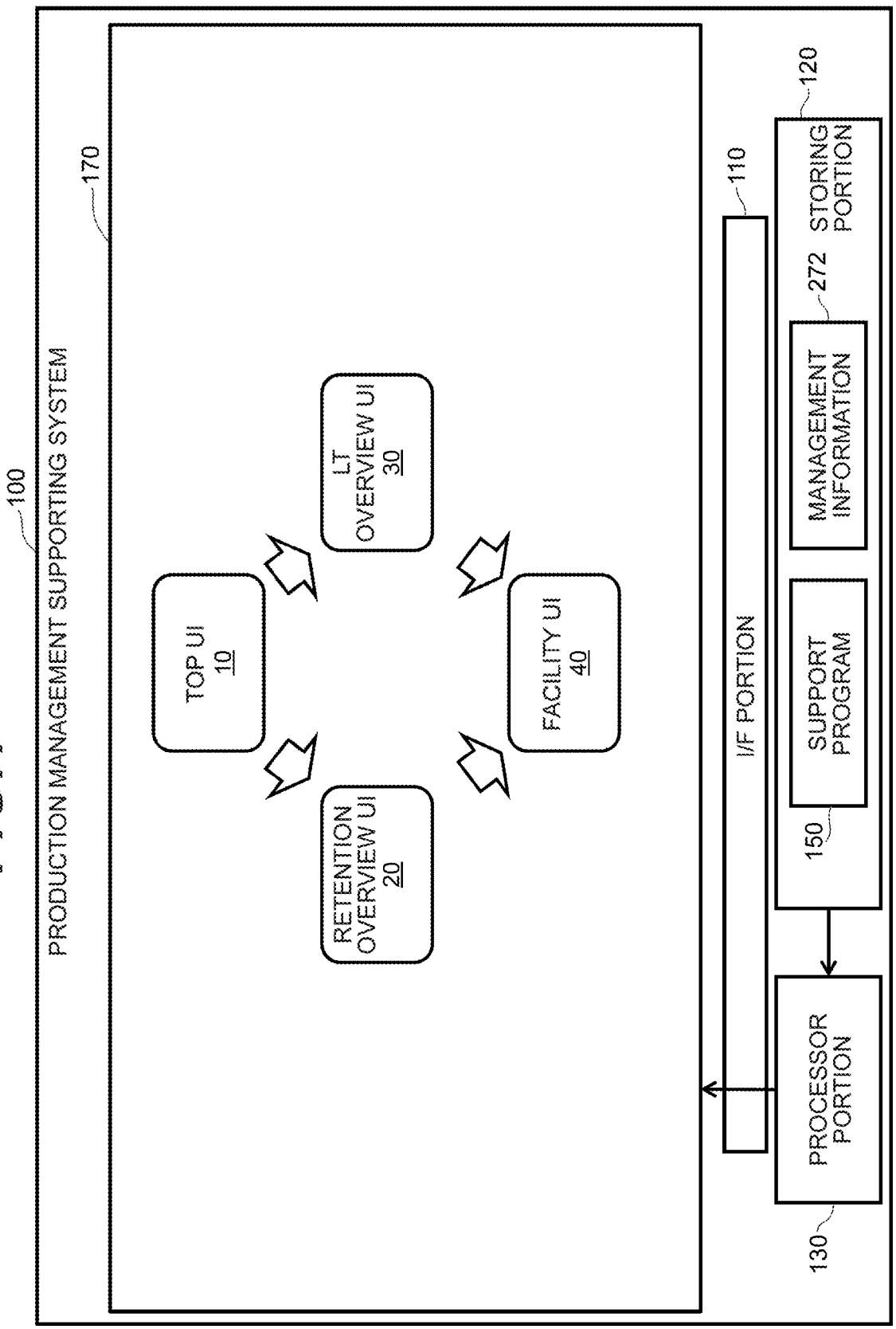
FIG. 1 shows the outline of an embodiment.

In the following description, an "interface portion" includes one or more interfaces. The one or more interfaces may include at least one of a user interface portion and a communication interface portion. The user interface portion may include at least one I/O device among one or more I/O devices (e.g., input devices (e.g., a keyboard and a pointing device) and an output device (e.g., a display device)) and a display computer or may include an interface device for the at least one I/O device. The communication interface portion may include one or more communication interface devices. The one or more communication interface devices may be one or more communication interface devices of the same type (i.e., one or more Network Interface Cards (NICs)) or two or more communication interface devices of different types (e.g., a NIC and a Host Bus Adapter (HBA)).

In the following description, a "storing portion" includes one or more memories. At least one of the memories associated with the storing portion may appropriately be a volatile memory. The storing portion is used mainly during a process performed by the processor portion. The storing portion may also include, in addition to the memories, one or more nonvolatile storing devices (e.g., Hard Disk Drives (HDDs) or Solid State Drives (SSDs)).

In the following description, the "processor portion" includes one or more processors. At least one of the processors is typically a microprocessor such as a Central Processing Unit (CPU), but the processors may also include a processor of another type such as Graphics Processing Unit (GPU). Each of the one or more processors may be a single-core processor or a multi-core processor. The processors may also include a hardware circuit which performs a part or the whole of a process.

In the following description, a process may be described using a "program" as a subject. Since a program performs a determined process by being executed by the processor portion, while appropriately using the storing portion (e.g., memory), the interface portion (e.g., communication port), and/or the like, the subject of the processor may also be the processor. The process described using the program as the subject may also be a process performed by the processor portion or an apparatus having the processor portion. The processor portion may also include a hardware circuit (e.g., Field-Programmable Gate Array (FPGA) or an Application Specific Integrated Circuit (ASIC)) which performs a part or the whole of the process. The program may also be installed from a program source to an apparatus such as a computer. The program source may be, e.g., a program distribution server or a recording medium (e.g., non-transitory recording medium) which is readable by the computer. In the following description, two or more programs may be implemented as one program or one program may be implemented as two or more programs.

In the following description, information may be described using such an expression as "a xxx table", but the information may be expressed using any data structure. Specifically, to show that the information does not depend on any data structure, "a xxx table" can be referred to also as "xxx information". Also, in the following description, a configuration of each table is exemplary. One table may be divided into two or more tables or all or any of two or more tables may be one table.

In the following description, a "production management supporting system" may be configured to include one or more computers. Specifically, when, e.g., a computer has a display device and displays information on the display device thereof, the computer may appropriately be the production management supporting system. Alternatively, when, e.g., a first computer (e.g., management server) transmits information to be displayed to a remote second computer (display computer (e.g., management client)) and the display computer displays the information (when the first computer displays the information on the second computer), at least the first computer of the first and second computers may appropriately be the production management supporting system. The production management supporting system may also have an interface portion, a storing portion, and a processor portion coupled to the interface portion and the storing portion. The "display of information to be displayed" by the computer in the production management supporting system may be the display of information to be displayed on the display device of the computer or may also be the transmission of the information to be displayed from the computer to the display computer (in the latter case, the display computer displays the information to be displayed). The function of at least one of the management server in the production management supporting system and the production management supporting system may also be implemented by a virtual computer (e.g., Virtual Machine (VM)) implemented by at least one physical computer (e.g., a physical calculation resource on a cloud basis). At least a portion of the production management supporting system may be software-defined.

A "product" generally means a produced item, i.e., a finished product. However, in the following description, the "product" means each of the items loaded in a production system. Accordingly, in the following description, the "product" may be any of an item before loaded into the production system, an item currently in the production system (i.e., "semi-finished product"), and a finished product in a shippable state through all the corresponding steps in the production system.

Also, in the following description, the intra-step range of a step x (x is a natural number) may be referred to as an "intra-step range x", while an inter-step range between the step x and a step y may be referred to as an "inter-step range x-y". Also, in the following description, the intra-facility range of a facility X (X is a natural number) may be referred to as an "intra-facility range X", while an inter-facility range between the facility X and a facility Y may be referred to as an "inter-facility range X-Y".

FIG. 1 shows the outline of the embodiment. Note that, in the following description, a facility belonging to a step is adopted as a step element by way of example, but the step element may be a step element other than the facility, for example, a worker, instead of or in addition to the facility. Also, in the following description, "UI", which stands for User Interface, typically refers to a Graphical User Interface (GUI).

A production management supporting system 100 has an I/F (interface) portion 110, a storing portion 120, and a processor portion 130 coupled to the I/F portion 110 and the storing portion 120. The storing portion 120 stores management information 272 and a support program 150.

The management information 272 includes information as a past record which shows, for each product loaded in the production system in which a plurality of different models of products are loaded and the sequential order of two or more of a plurality of steps is different depending on the model, an execution time of each of the steps. The execution time of the step may be one or more times selected between the starting time of the step and the ending time thereof in accordance with a predetermined rule. In the present embodiment, both of the starting time and the ending time are adopted.

The support program 150 performs visualization of a production situation as one of supports for production management. Specifically, the support program 150 is executed by the processor portion 130 to perform a production management support process 170 of narrowing step by step target information to be displayed on the basis of a result of analyzing the management information 272 in response to a selection operation. The "selection operation" is a user operation for selecting any one or more targets corresponding to the displayed information and may be, for example, selecting a range using a mouse or pressing a GUI button on a UI.

The production management support process 170 includes displaying a top User Interface (UI) 10; displaying one of a retention holistic UI 20 and a lead time holistic UI 30 in response to a selection operation on the UI 10, and displaying a facility UI 40 in response to a selection operation on the UI 20 or the UI 30.

The top UI 10 may be a UI for receiving a selection of whether to survey the production situation in the production system in the date and time view or the product view. Note that the top UI 10 and one of the retention holistic UI 20 and the lead time holistic UI 30 need not always be provided. For example, depending on predetermined settings or the type of business to which the production management support system 100 is applied, the top UI 10 may not be provided, and one of the retention holistic UI 20 and the lead time holistic UI 30 may not be provided. In the present embodiment, each of the UIs 10, 20, and 30 is a UI that can be displayed in the production management support process 170.

The retention holistic UI 20 is displayed by the support program 150, for example, when a selection of date and time view is received via the top UI 10. The retention holistic UI 20 provides a holistic view of a retention number during a display target period. The holistic view of the retention number (or the holistic view of the retention number after the model is further narrowed down) assists the user in guessing an intra-step range or an inter-step range as the cause of a large number of retentions. The "display target period" is a period of a production situation to be displayed out of the managed production situations.

The lead time holistic UI 30 is displayed by the support program 150, for example, when a selection of product view is received via the top UI 10. The lead time holistic UI 30 provides a holistic view of an actual lead time (a lead time actually taken) during the display target period. The holistic view of the lead time (or the holistic view of the lead time after the model is further narrowed down) assists the user in guessing an intra-step range or an inter-step range as the cause of a long actual lead time.

The facility UI 40 is displayed by the support program 150 when a selection operation for selecting an intra-step range or an inter-step range is performed on the retention holistic UI 20 or the lead time holistic UI 30. The facility UI 40 provides information related to a facility belonging to the selected intra-step range or inter-step range (information specified from the management information 272). From the information, it is expected that the user can specify which facility belonging to the intra-step range or the inter-step range is the problem.

The following will describe the present embodiment in detail.

Figure 2:
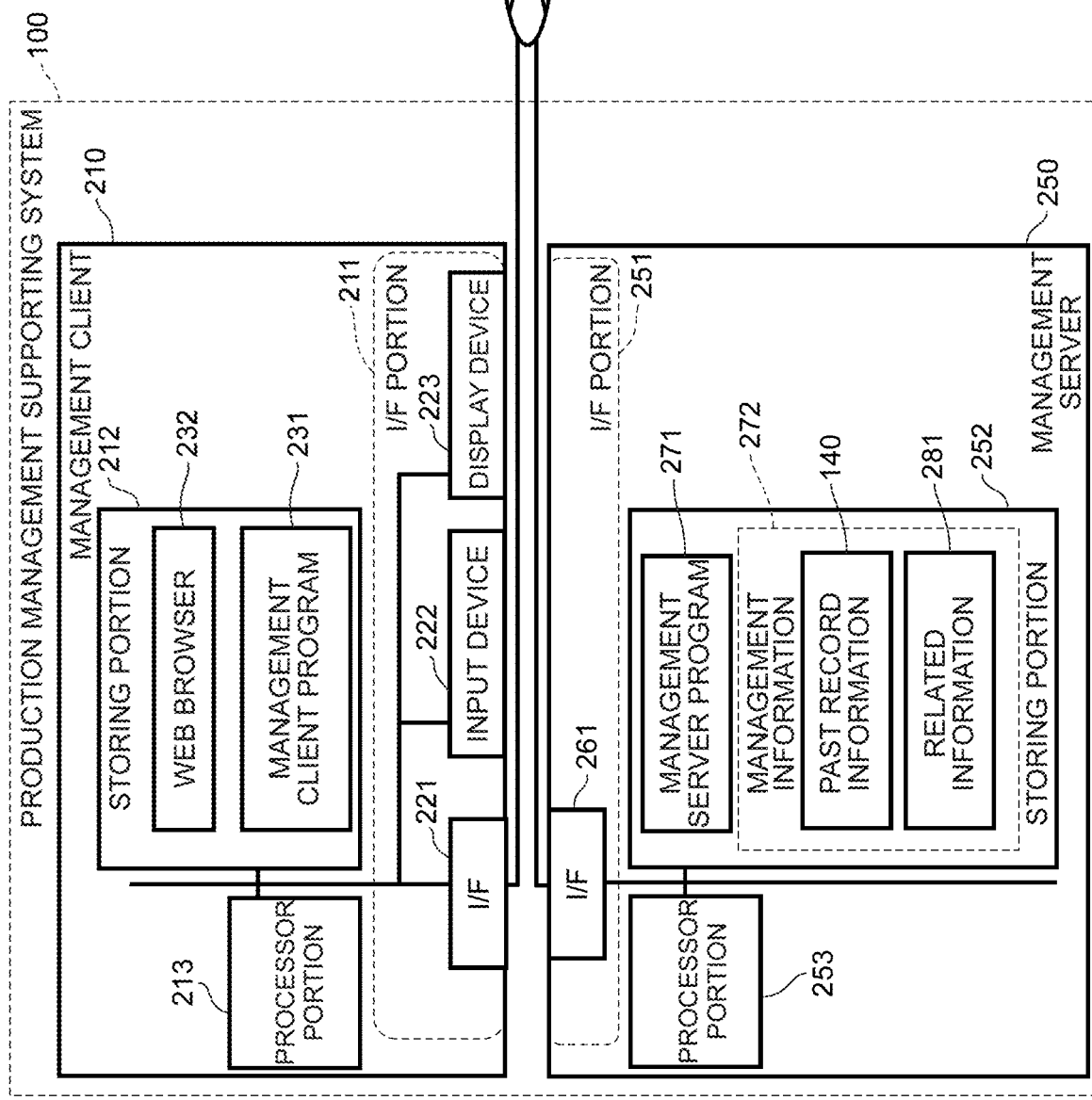
FIG. 2 shows a configuration of a production management supporting system according to the embodiment.

FIG. 2 shows a configuration of the production management supporting system 100.

The production management supporting system 100 includes a management server 250 and one or more management clients 210 coupled to the management server 250. To the management server 250, each of the management clients 210 and a production system 200 is coupled via a communication network (e.g., a Local Area Network (LAN), a Wide Area Network (WAN), or the Internet) 290.

The production system 200 is a production system (e.g., a factory) in which a plurality of different models of products are loaded and the sequential order of two or more of a plurality of steps is different depending on the model, and is, for example, a job shop production system or a cell production system. The production system 200 includes a plurality of facilities (apparatuses) for a plurality of steps, a plurality of sensors which regularly perform measurement for a plurality of measurement items with regard to the plurality of steps, and a server which stores a plurality of measurement values regularly obtained using the plurality of sensors and transmits the plurality of measurement values to the management server 250. From the production system 200, information (raw data such as, e.g., production dynamic state data, facility data, and quality measurement data) is regularly or irregularly transmitted to the management server 250 and stored in the management server 250. For example, the information includes, for each product, a product ID, and the starting time and the ending time of each step.

The management client 210 has an I/F portion 211, a storing portion 212, and a processor portion 213 coupled to the I/F portion 211 and the storing portion 212.

The I/F portion 211 includes an I/F (communication interface device coupled to the communication network 290) 221, an input device (e.g., pointing device or keyboard) 222, and a display device (device having a physical screen which displays information) 223. A touch screen integrally including the input device 222 and the display device 223 may also be adopted.

The storing portion 212 stores a computer program executed by the processor portion 213 and information used by the processor portion 213. Specifically, for example, the storing portion 212 stores a management client program 231 and a Web browser 232. The management client program 231 communicates with the management server 250 and displays the UI described above via the Web browser 232.

The management server 250 has an I/F portion 251, a storing portion 252, and a processor portion 253 coupled to the I/F portion 251 and the storing portion 252.

The I/F portion 251 includes an I/F (communication interface device coupled to the communication network 290) 261.

The storing portion 252 stores a computer program executed by the processor portion 253 and information used by the processor portion 253. Specifically, for example, the storing portion 252 stores a management server program 271 and management information 272. The management server program 271 communicates with the management client program 231. The management information 272 includes the past record information 140 and related information 281. The past record information 140 is information related to a past record such as the starting time and the ending time of each of the steps for each product loaded in the production system 200. The past record information 140 may include the raw data mentioned above. The related information 281 is information related to the past record. A portion of the related information 281 may also be data generated on the basis of the result of analyzing the past record information 140. The related information 281 includes a threshold (e.g., threshold in each inter-step range (and/or in each intra-step range)) to be compared to the retention number in, e.g., the inter-step range (and/or intra-step range).

Through a cooperative process performed by the management server program 271, the management client program 231, and the Web browser 232, the display of the UI is implemented.

The relationships between the components shown in FIG. 2 and the components shown in FIG. 1 are, e.g., as follows. Specifically, of the I/F portions 211 and 251, at least the I/F portion 251 corresponds to the I/F portion 110. Of the storing portions 212 and 252, at least the storing portion 252 corresponds to the storing portion 120. Of the processor portions 213 and 253, at least the processor portion 253 corresponds to the processor portion 130. Of the management server program 271, the management client program 231, and the Web browser 232, at least the management server program 271 corresponds to the support program 150.

Figure 3:
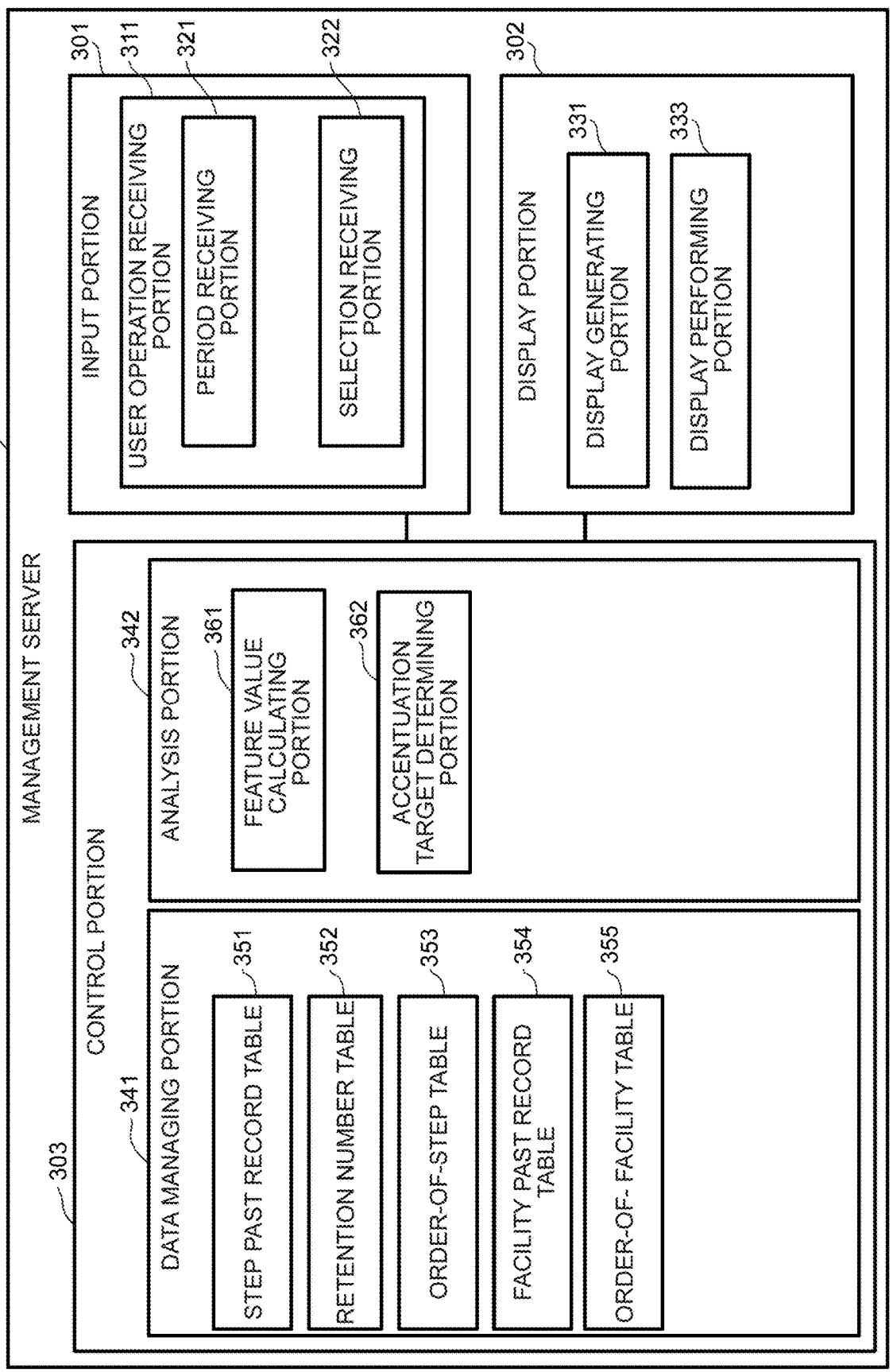
FIG. 3 shows an example of functions implemented in a management server.

FIG. 3 shows an example of the functions implemented in the management server 250.

The management server program 271 is executed by the processor portion 253 to allow the illustrated functions, i.e., an input portion 301, a display portion 302, and a control portion 303 to be implemented. In other words, the management server program 271 has the input portion 301, the display portion 302, and the control portion 303.

The input portion 301 is the function for receiving information. The input portion 301 includes a user operation receiving portion 311. The user operation receiving portion 311 is a function for receiving a user operation (operation performed on the screen by the user using the input device). The user operation receiving portion 311 includes a period receiving portion 321 and a selection receiving portion 322.

The period receiving portion 321 is a function for receiving a specification of the display target period. The selection receiving portion 322 is a function for receiving the selection operation described above.

The display portion 302 is the function for displaying information. The display portion 302 includes a display generating portion 331 and a display performing portion 333. The display generating portion 331 is a function for generating the display of a UI (e.g., drawing it on a memory portion). The display performing portion 333 is a function for performing the display of the generated UI.

The control portion 303 is a function for control. The control portion 303 includes a data management portion 341 and an analysis portion 342.

The data management portion 341 acquires past record data of a product or a facility and updates a step past record table 351, a retention number table 352, and a facility past record table 354 on the basis of the past record data. Also, the data management portion 341 manages tables such as the step past record table 351, the retention number table 352, an order-of-step table 353, the facility past record table 354, and an order-of-facility table 355.

Note that the "past record data" is data showing the past record of production and including, e.g., a product ID (e.g., product number), a step ID (e.g., step number), a time (e.g., the collection time of the data or the starting time and the ending time of the step), and a status (showing that, e.g., a process is currently performed in the step or the step was ended). For example, the data managing portion 341 regularly or irregularly collects the past record data from the production system. 200 and updates the step past record table 351 and the facility past record table 354 on the basis of the collected past record data. The tables 351 and 354 are at least a portion of the past record information 140.

The retention number table 352 is dynamically generated on the basis of the step past record table 351. The order-of-step table 353 and the order-of-facility table 355 are prepared in advance. The retention number table 352, the order-of-step table 353, and the order-of-facility table 354 are at least a portion of the related information 281.

The analysis portion 345 is a function for analyzing the management information 272. The analysis portion 345 includes a feature value calculating portion 361 and an accentuation target determining portion 362. The feature value calculating portion 361 calculates a feature value of the production status of a product during the display target period. In the present embodiment, the feature value is a retention number or an actual lead time. The accentuation target determining portion 362 determines the presence or absence of an accentuated display target. When there is an accentuated display target, the accentuation target determining portion 362 causes the display portion 302 to draw and perform the accentuated display of the target.

FIG. 4 shows an example of a step past record table.

The step past record table 351 holds information related to the production past records in steps. Specifically, the step past record table 351 has, e.g., records for individual statuses in a step on a one-to-one basis. Each record stores information such as a step ID 401, a date/time 402, a product ID 403, and a date/time status 404. One combination (a combination of a step, a date/time, a product, and a status) is taken as an example (which is a "combination of interest" in the description of FIG. 4). Also, in the description of FIG. 4, the step, the date/time, the product, and the date/time status belonging to the combination of interest are referred to as the step of interest, the date/time of interest, the product of interest, and the status of interest, respectively.

The process ID 401 indicates the ID of the step of interest. The date/time 402 indicates the date/time of interest (the date and time when the date/time status of interest occurred for the product of interest in the step of interest). Also, in the present embodiment, a date/time is an example of a time, and the unit of a date/time is represented in a year/month/day/hour/minute/second unit, but the unit may be rougher or finer than the unit used in the present embodiment. A time may also be represented in a different unit. The product ID 403 indicates the ID of the product of interest. The date/time status 404 indicates a date/time status of interest (e.g., the step is "start"ed or the step is "done").

FIG. 5 shows an example of the retention number table 352.

The retention number table 352 holds, for each time slice (e.g., every one minutes), the retention numbers calculated on a per inter-step and intra-step range basis. Specifically, for example, the retention number table 352 has records for the individual inter-step ranges and the individual intra-step ranges on a one-to-one basis. In each record, the retention number calculated for the intra-step range or inter-step range corresponding to the record is recorded on a per time slice basis. The retention number table 352 is prepared, for example, for each model.

FIG. 6 shows an example of the order-of-step table 353.

The order-of-step table 353 shows the relationship between a model and a sequential order of steps. Specifically, the order-of-step table 353 has records for individual models on a one-to-one basis. Each record stores information such as a model ID 601, a product ID 602, an order of steps 603, a partial standard lead time (standard time) 604, and a standard lead time 605. One model is taken as an example (which is a "model of interest" in the description of FIG. 6).

The model ID 601 indicates the ID of the model of interest. The product ID 602 indicates the product ID of each product belonging to the model of interest. The order of steps 603 indicates step IDs arranged in the sequential order of the steps for the model of interest. The partial standard lead time 604 indicates a partial standard lead time (standard time) for each step (each intra-step range) of the sequential order of the steps for the model of interest. The arrangement of the partial standard lead times in the partial standard lead time 604 corresponds to the arrangement of the step IDs in the order of steps 603. The standard lead time 605 indicates a standard lead time of a product belonging to the model of interest. The standard lead time includes, in addition to the partial standard lead time that is a time for each intra-step range, a time for each inter-step range (e.g., a time as taking into account a transport time and a waiting time when moving from one step to the next step). Therefore, the standard lead time corresponding to the model of interest is typically larger than the total of a plurality of partial standard lead times (standard times) corresponding respectively to a plurality of steps of the sequential order of the steps belonging to the model of interest.

FIG. 7 shows an example of the facility past record table 354.

The past record table 354 holds information related to the production past records in facilities. Specifically, the facility past record table 354 has, e.g., records for individual statuses of a facility on a one-to-one basis. Each record stores information such as a facility ID 701, a date/time 702, a product ID 703, a step ID 704, a model ID 705, a facility status 706, and a date/time status 707. One combination (a combination of a facility, a date/time, a product, a step, a model, a facility status, and a date/time status) is taken as an example (which is a "combination of interest" in the description of FIG. 7). Also, in the description of FIG. 7, the facility, the date/time, the product, the step, the model, the facility status, and the date/time status belonging to the combination of interest are referred to as the facility of interest, the date/time of interest, the product of interest, the step of interest, the model of interest, the facility status of interest, and the date/time status of interest, respectively.

The facility ID 701 indicates the ID of the facility of interest (the facility belonging to the step of interest). The date/time 702 indicates the date/time of interest (the date and time when the facility status of interest and the date/time status of interest occurred for the product of interest in the step of interest). The product ID 703 indicates the ID of the product of interest. The step ID 704 indicates the ID of the step of interest. The model ID 705 indicates the ID of the model of interest (the model to which the product of interest belongs). The facility status 706 indicates the facility status of interest (the status of the facility of interest, e.g., "in operation" or "in setup change"). The date/time status 707 indicates the date/time status of interest (the date/time status of the product of interest in the step of interest).

Figures 8, 9:
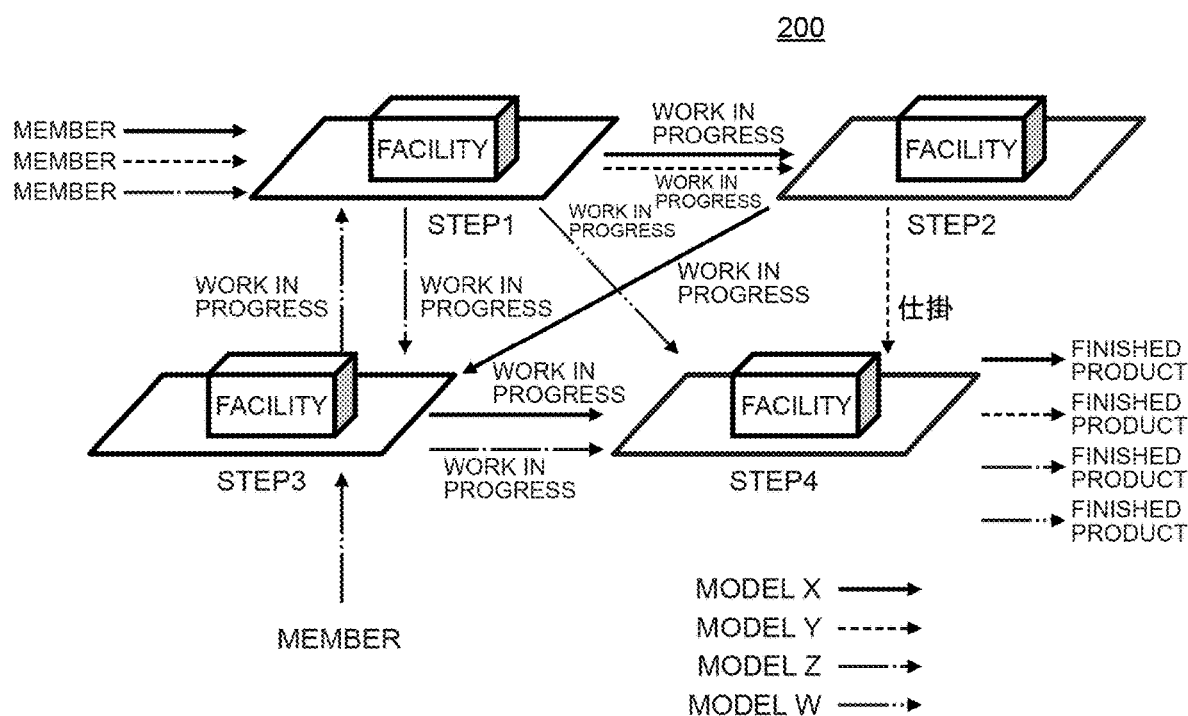
FIG. 8 shows an example of an order-of-facility table.
FIG. 9 shows a configuration example of a production system.

FIG. 8 shows an example of the order-of-facility table 355.

The order-of-facility table 355 shows the relationship between a step and a sequential order of facilities. Specifically, the order-of-facility table 355 has, e.g., records for individual steps on a one-to-one basis. Each record stores information such as a step ID 801 and an order of facilities 802. One step is taken as an example (which is a "step of interest" in the description of FIG. 8).

The step ID 801 indicates the ID of the step of interest. The order of facilities 802 indicates facility IDs arranged according to the sequential order of the facilities for the step of interest. Note that in the "order-of-facility", the facilities do not necessarily have to be arranged sequentially, and for example, at least some of the facilities may be arranged in parallel (at the same order). A facility standard lead time 803 indicates a facility standard lead time that is a standard required time for each facility (each intra-facility range) of the sequential order of the facilities for the step of interest. The arrangement of the facility standard lead times in the facility standard lead time 803 corresponds to the arrangement of the facility IDs in the order of facilities 802. A partial standard lead time 804 indicates a partial standard lead time for the step of interest. The partial standard lead time includes, in addition to the facility standard lead time that is a time for each intra-facility range, the time for each inter-facility range (e.g., a time when moving from a facility to the next facility). Therefore, the partial standard lead time for the step of interest is typically larger than the total of a plurality of facility standard lead times corresponding respectively to a plurality of facilities of the sequential order of the facilities belonging to the step of interest.

Figure 10:
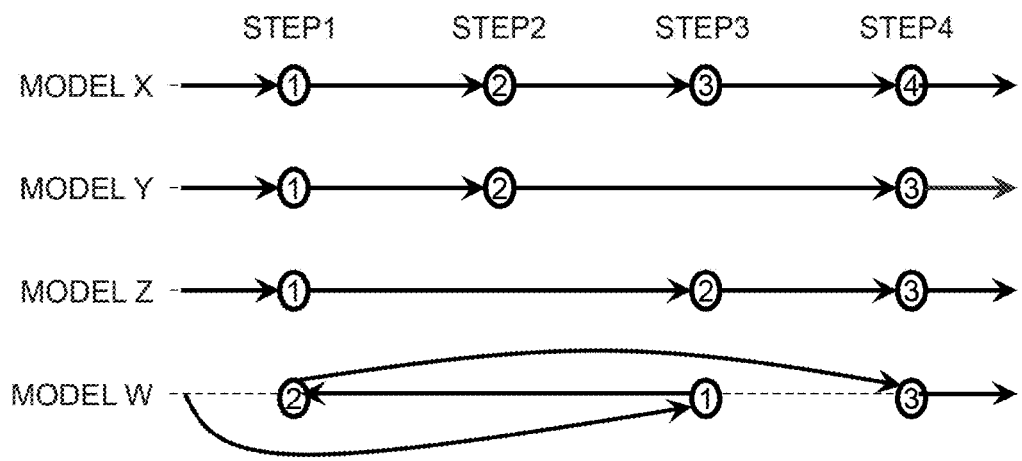
FIG. 10 schematically shows the sequential order of steps for each model.

The management server program 271 performs the production management support process on the basis of the management information 272 including the tables 351 to 355 as described above. The production management support process according to the present embodiment is useful for production management in the production system 200, i.e., the production system in which a plurality of different models of products are loaded and the sequential order of two or more of a plurality of steps is different depending on the model. To understand its usefulness, it is necessary to understand an example of the configuration and problems of the production system 200. Accordingly, an example of the configuration and problems of the production system 200 will be described with reference to FIGS. 9 to 11.

FIG. 9 shows a configuration of the production system 200. Note that, in FIG. 9, a product for which each step has not started is referred to as "member", a product for which the step has been started but not completed is referred to as "in-process", and a product for which the step has been completed is referred to as "finished product". In other words, for each step, the name of the product changes from member->in-process->finished product. In each step, the finished product in the previous step corresponds to the member before the start of the step. In the present invention, the "product" may be any product of the member, the in-process, and the finished product. Also, in the present embodiment, there is at least one facility in each step.

In the production system 200, there is a production line, for one model, in which two or more steps are arranged in the sequential order of steps corresponding to the model. Therefore, a plurality of different production lines respectively corresponding to the different models share one or some of the steps. For example, two or more production lines respectively corresponding to given two or more models share a given step, and other two or more production lines respectively corresponding to other two or more models share another step. Accordingly, when the models are narrowed down, the production system 200 is a system similar to the line production system.

The production system 200 differs from the line production system in at least the following two points.

The first point of difference is that at least the sequential order of the steps is different depending on the model in the production system 200. Two or more steps to be performed may differ depending on the model. For example, as shown by way of examples in FIGS. 9 and 10, for a product belonging to a model X, all of steps 1 to 4 are performed, and they are performed in the order of step 1, step 2, step 3, and step 4. For a product belonging to a model Y, the steps other than the step 2 of steps 1 to 4 are performed, and they are performed in the order of step 1, step 3, and step 4. For a product belonging to a model W, the same steps as those for the product belonging to the model Y are performed, but they differ in the execution order. Specifically, the steps other than step 2 of steps 1 to 4 are performed in the order of step 3, step 1, and step 4 (in this way, there are models for which initial step is a step other than step 1). Because of these characteristics, the standard lead time of products differs depending on the model.

Figure 11:
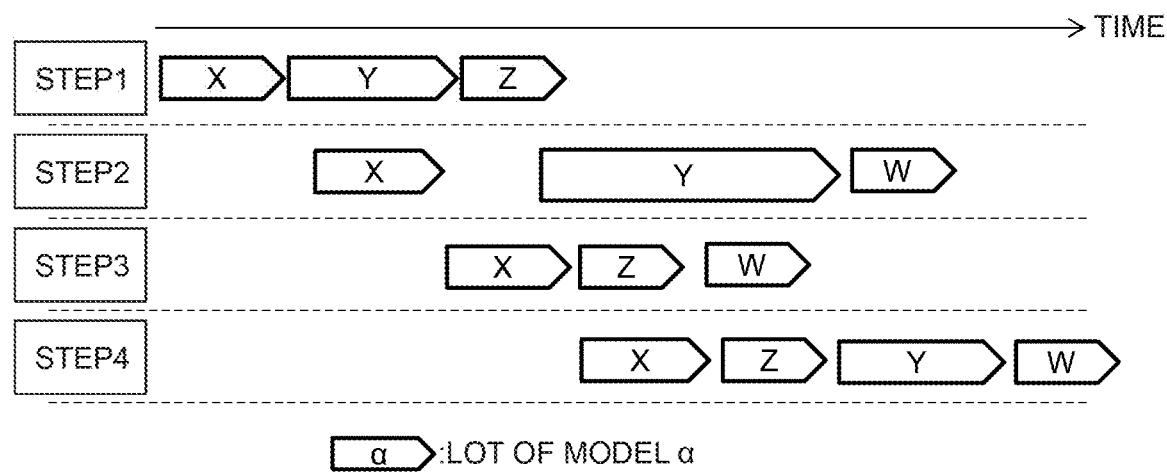
FIG. 11 schematically shows an example of the steps for each model in time series.

The second point of difference is that two or more products belonging to two or more models can be produced in parallel. As shown by way of example in FIG. 11, in some cases, the initial step for a first model starts earlier than that for a second model, but the final step ends later and vice versa (i.e., first-in first-out (FIFO) does not necessarily hold). Also, each model is affected by one or more other models. In the example of FIG. 11, the influence of the prolongation of step 2 for the product belonging to product Y causes a delayed start of step 2 for the product belonging to product W even though the previous step 3 for the product belonging to product W has been completed earlier (such an influence is expected to appear in the form of an increase in the retention number or an increase in the actual lead time). Note that, in the example of FIG. 9, only one facility is present in each step for simplification of the description. For this reason, in each step, there is one model present at the same day and time (time slice). However, there may be a plurality of facilities in at least one step. In this case, two or more products belonging to two or more models may present at the same day and time in the at least one step (e.g., a product belonging to the model Y and a product belonging to the model X at step 2 may be present at the same day and time). Note that, in each step, typically, a plurality of products (members) are continuously loaded in each facility in a unit (lot).

Figure 21:
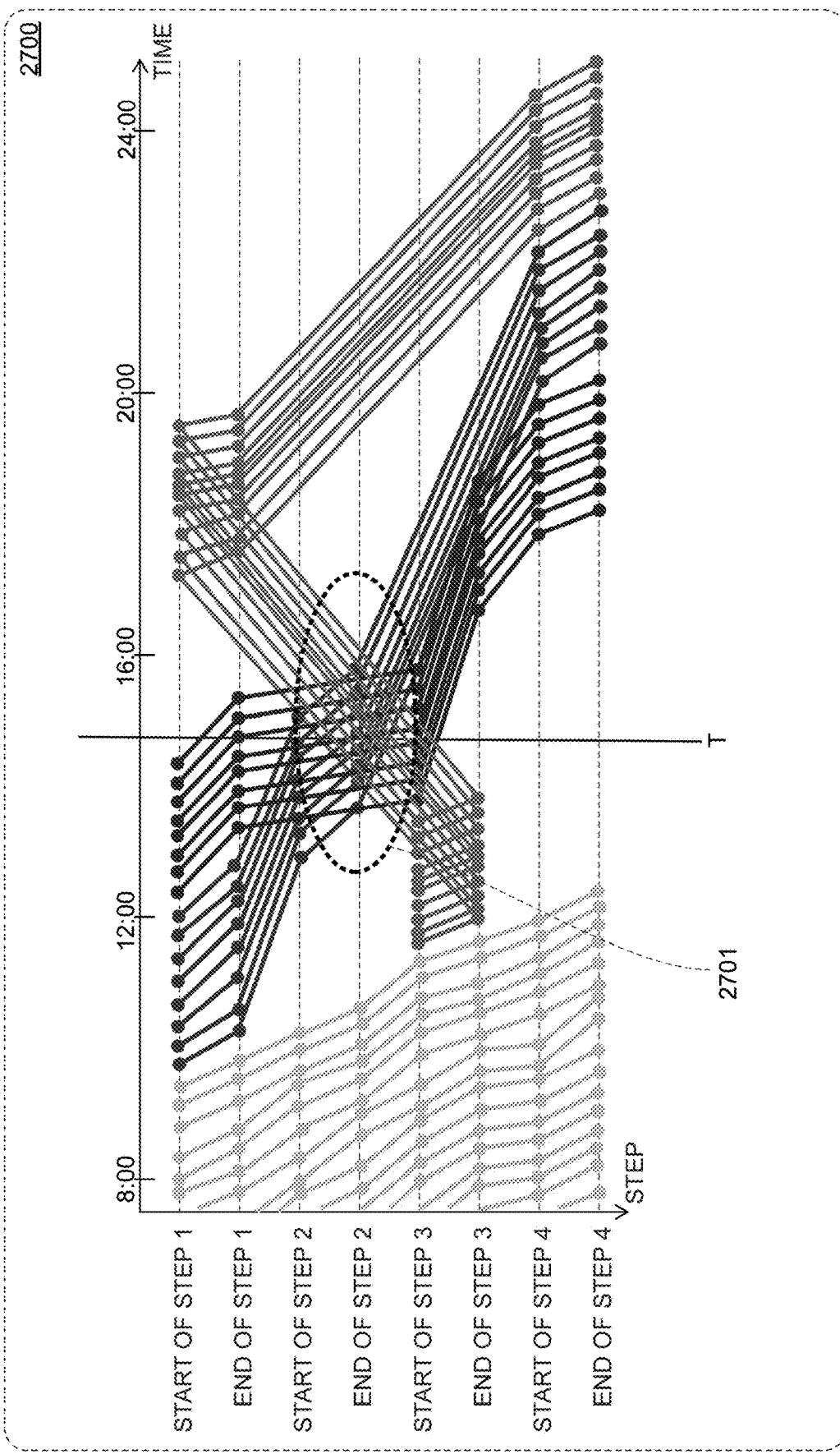
FIG. 21 shows an example of a chart according to a comparative example to which production management of a line production system is simply applied.

When production management of the line production system is simply applied to production management of the production system 200, a diagram chart 2700 shown by way of example in FIG. 21 can be displayed. However, a chart 2700 has the following problems. This makes it difficult to recognize the production status such as the retention situation and the actual lead time.

(Problem A) The propriety of the situation cannot be determined from the inclination of the polygonal line. For example, even when overtaking appears on the chart 2700, it cannot be determined whether or not the overtaking is appropriate (see, e.g., reference numeral 2701). This is because the standard lead time differs depending on the model.

(Problem B) It is difficult to calculate the retention number for the intra-step range. Specifically, the fact that the retention number is the number of products present in the time slice for the intra-step range is not necessarily an accurate retention number. This is because the sequential order of the steps differs depending on the model, and as a result, the intra-step range may differ. For example, according to the chart 2700, it appears that a plurality of models of products are present in the time slice T for the inter-step range 2-3, but the models corresponding to the sequential order of the steps not including the inter-step range 2-3 (models with no plot at the start of step 3) are present.

(Problem C) It is hard to recognize the retention portion. This is because the sequential order of the steps is different depending on the model, and as a result, there are many overlapping and crossing of polygonal lines as compared with the diagram chart for the line production system.

(Problem D) It is hard to identify the retention tendency. This is because, depending on the model, a step not passed is displayed, or there is a polygonal line including a line segment that returns from down to up.

Thus, in the case where products of different models are continuously produced, it is difficult to specify any one of the following even when the visualized production situation is viewed, resulting in a problem of reduction in productivity.

Models having a lead time significantly different from the standard lead time (planned lead time).
Increase in the retention number.

Therefore, in the present embodiment, the production management support process is performed which is described with reference to FIG. 1 and also described in detail below. Specifically, for example, a model to be focused on is determined from a state in which different models are mixed, and after the determination of the model, information to be visualized is drilled down in the order of: order of steps, step, and facility. In this case, drilldown is performed in the range of the narrowed-down model. Note that a step to be focused on may be determined without determining a model. In this case, in terms of the information visualized for the step, one or more models for which the step is included in the sequential order of the steps are mixed.

Figure 12:
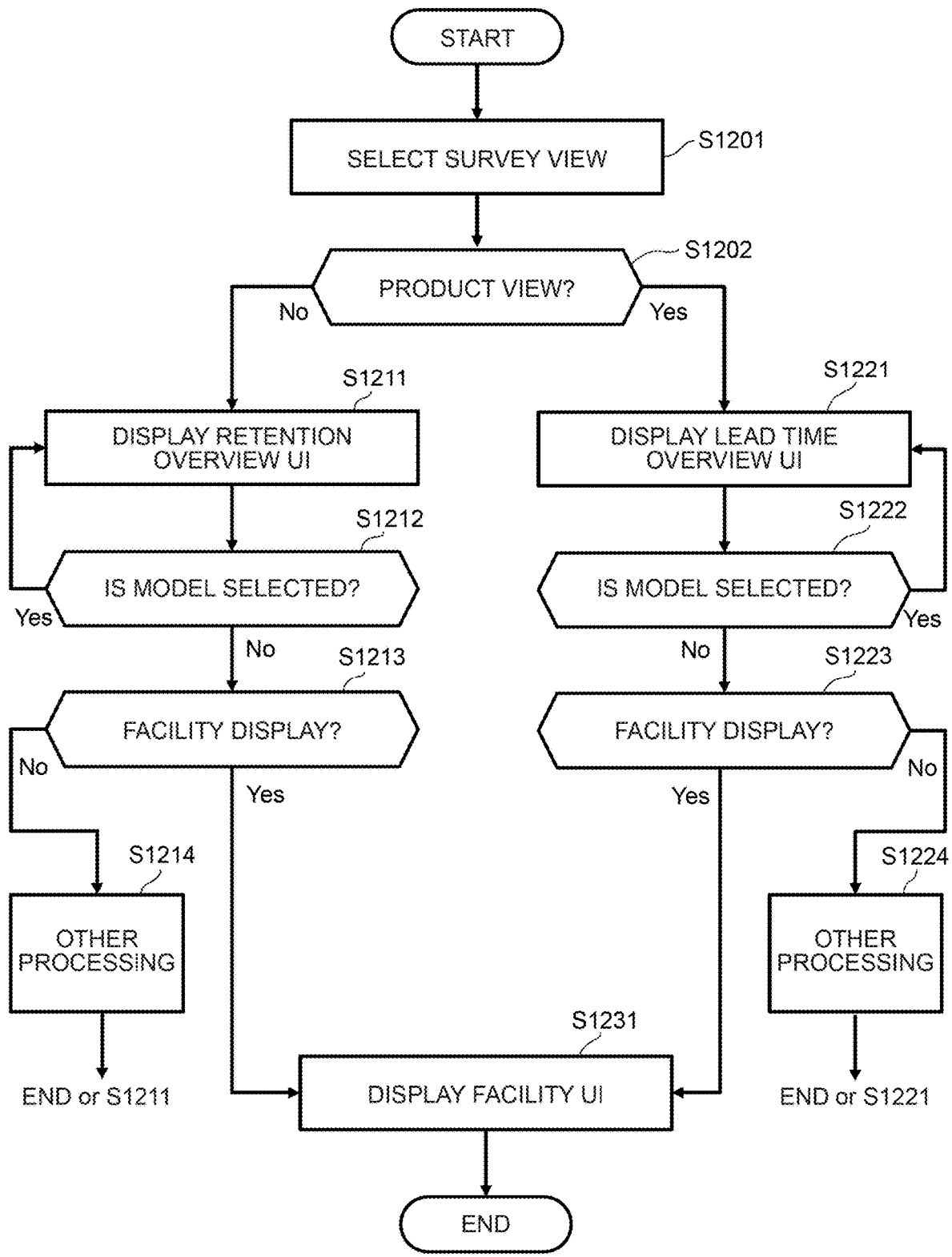
FIG. 12 shows an example of the flow of a production management support process.

FIG. 12 shows an example of the flow of the production management support process.

The management server program 271 receives a selection of survey view (and, e.g., specification of a display target period) through the top UI 10 (see FIG. 1) (S1201).

Figure 13:
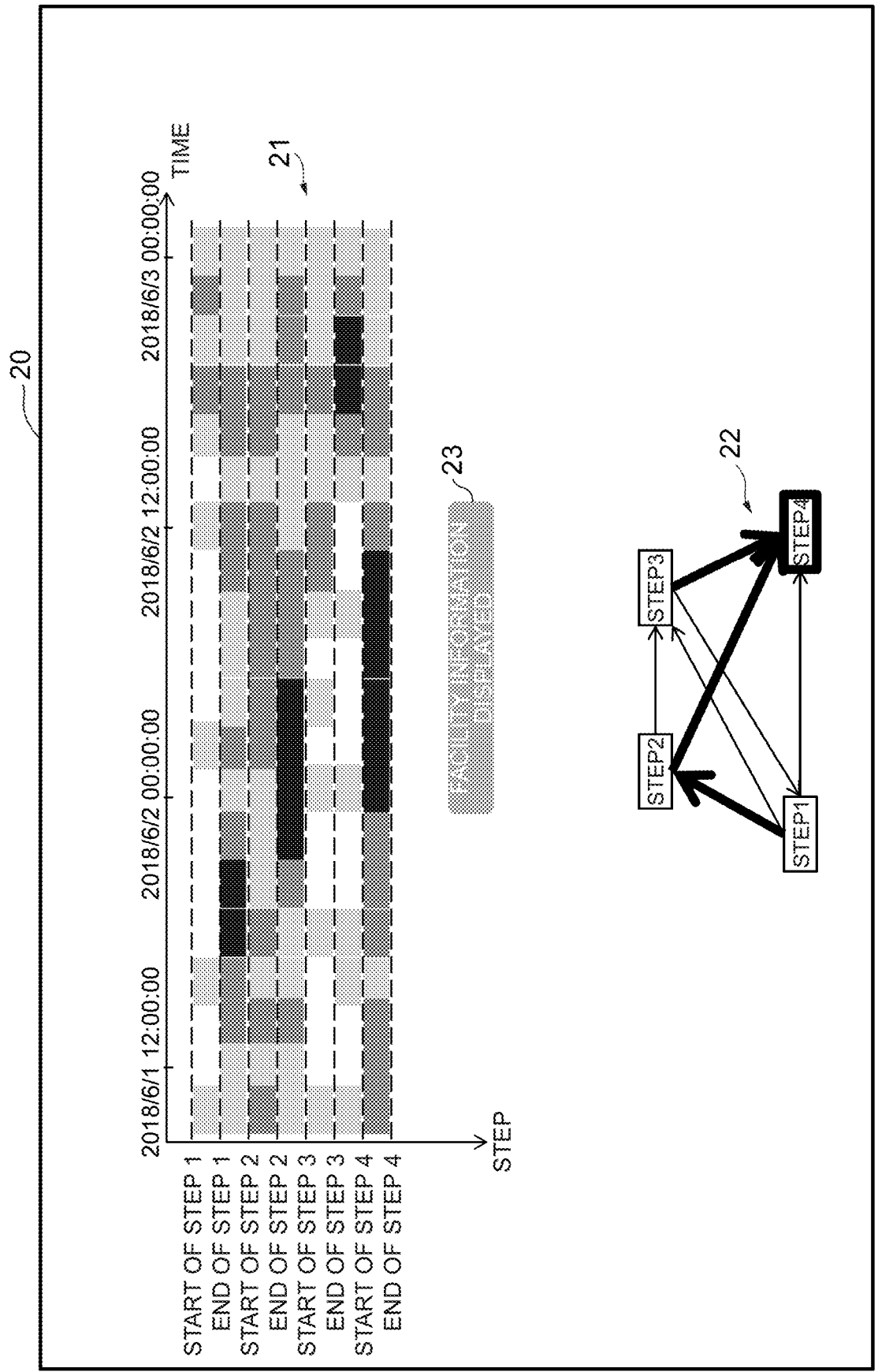
FIG. 13 shows an example of a retention holistic UI.

When the selection received in S1201 is a selection of date and time view (S1202: No), the management server program 271 displays the retention holistic UI 20 that provides a holistic view of the retention number specified on the basis of the management information 272 (S1211). FIG. 13 shows an example of that UI 20.

Figure 14:
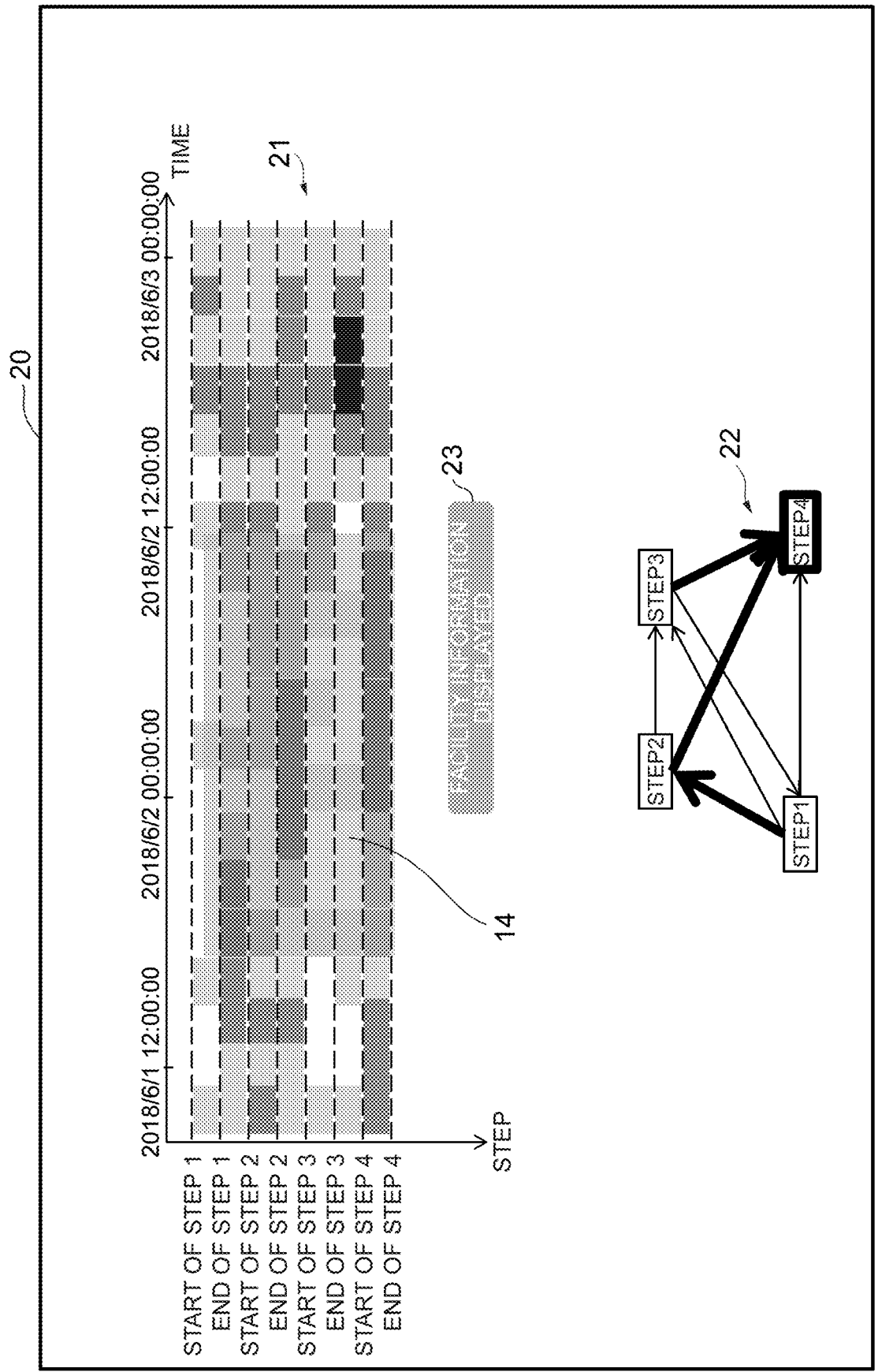
FIG. 14 shows an example of a retention holistic UI.
Figure 15:
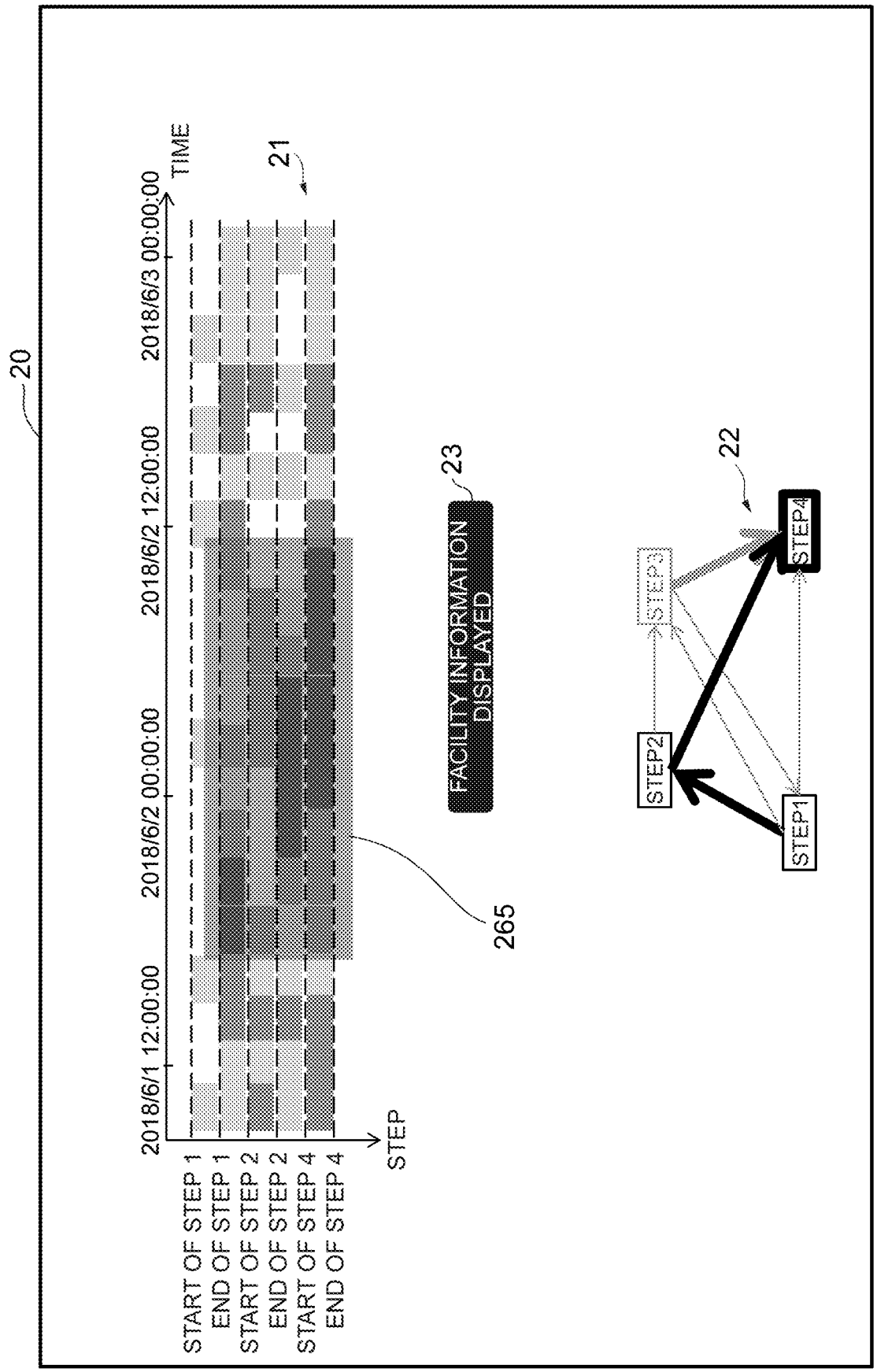
FIG. 15 shows an example of a retention holistic UI.

When a model is selected after S1211 (S1212: Yes), the management server program 271 updates the display of the retention holistic UI 20 in S1211. FIG. 14 shows an example of model selection. FIG. 15 shows an example of the UI 20 after the update. Note that, when the date and time view is selected, the management server program 271 may select a model from the plurality of models on the basis of the management information 272 (e.g., select a model in which the retention number is the largest during the display target period) and display the retention holistic UI 20 that provides a holistic view of the retention number for the selected model. Specifically, as an example, the UI 20 illustrated in FIG. 15 may be displayed without displaying the UI 20 illustrated in FIGS. 13 and 14.

Figure 16:
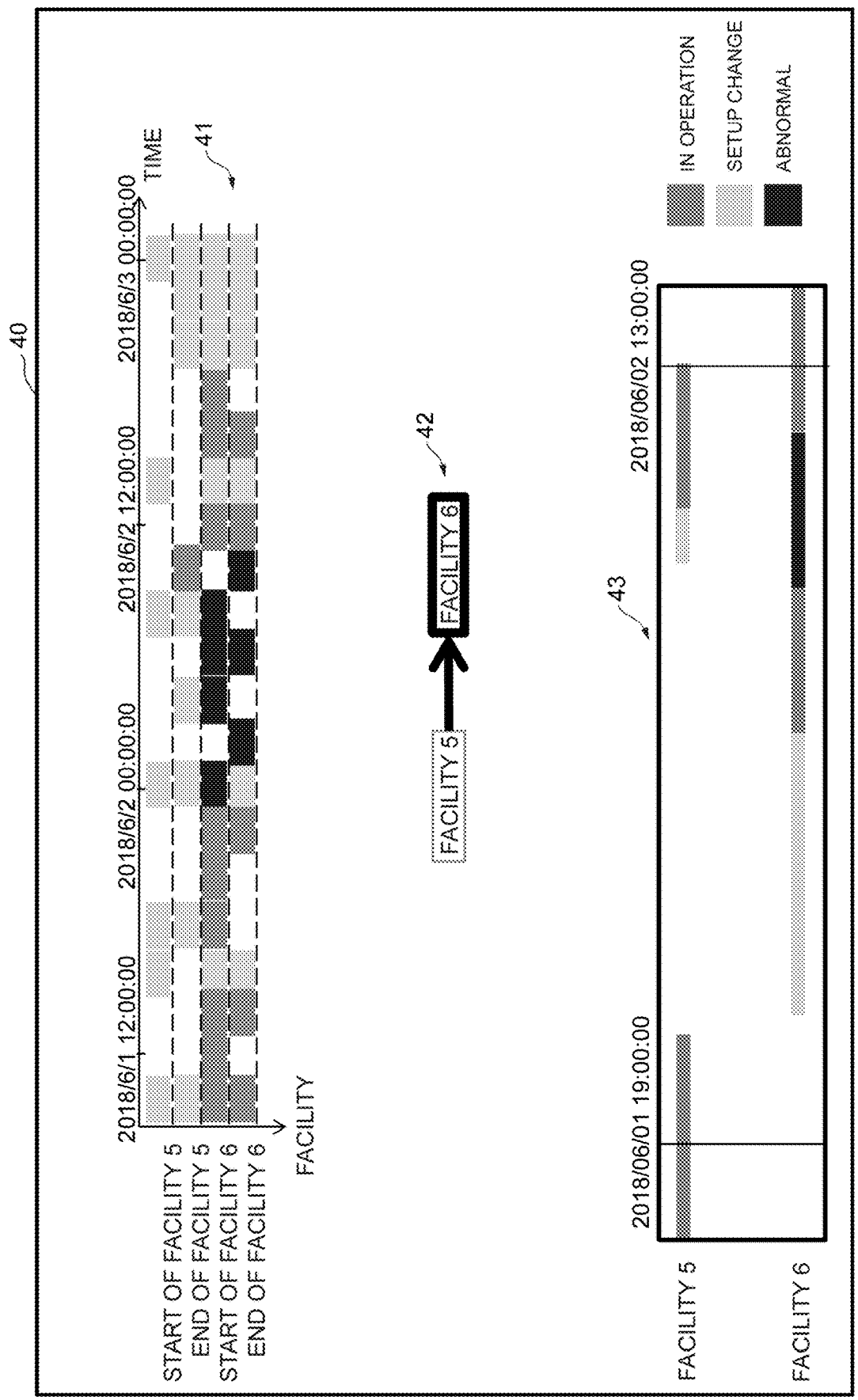
FIG. 16 shows an example of a facility UI.

After S1211 (e.g., after displaying the UI 20 that provides a holistic view of the retention number for the selected model), when receiving a selection of facility display (S1213: Yes), the management server program 271 displays the facility UI 40 (S1231). FIG. 16 shows an example of that UI 40.

For example, when a user operation other than model selection and facility display (e.g., a user operation to close the UI 20) is performed (S1213: No), the management server program 271 performs processing according to the user operation (S1214).

Figure 17:
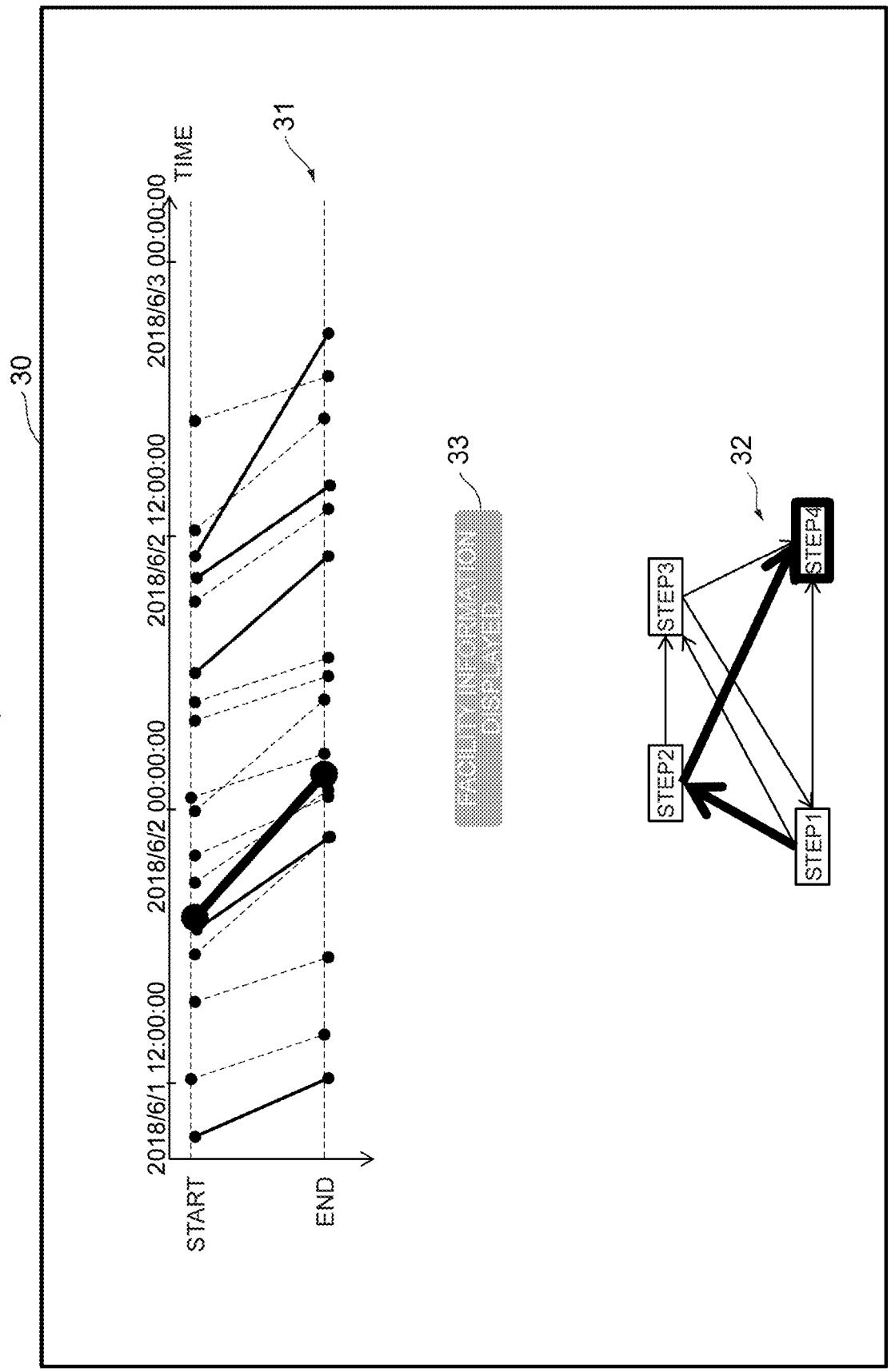
FIG. 17 shows an example of a lead time holistic UI.

When the selection received in S1201 is a selection of product view (S1202: Yes), the management server program 271 displays the lead time holistic UI 30 that provides a holistic view of the actual lead time specified on the basis of the management information 272 (S1221). FIG. 17 shows an example of that UI 30.

Figure 18:
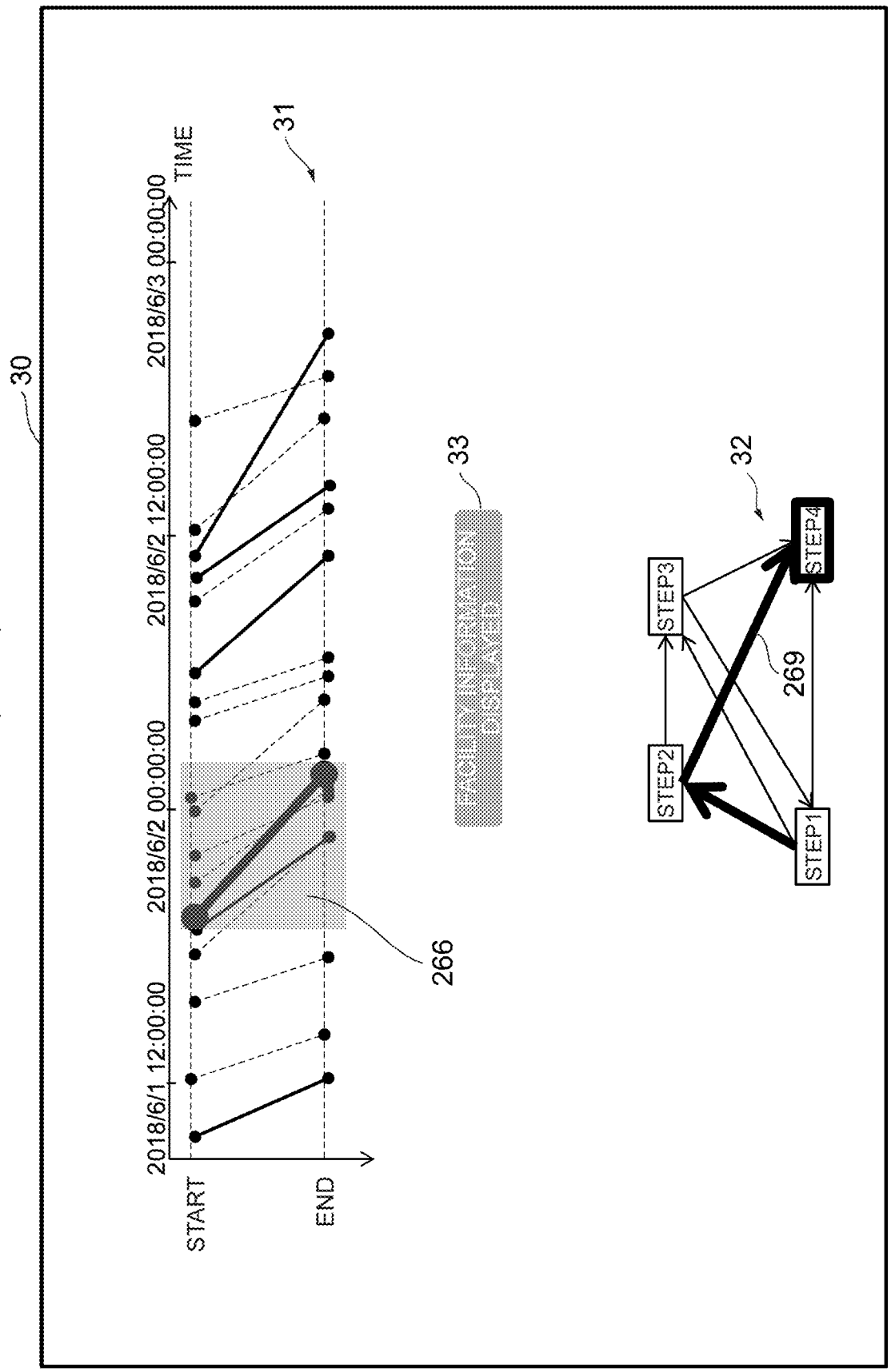
FIG. 18 shows an example of a lead time holistic UI.
Figure 19:
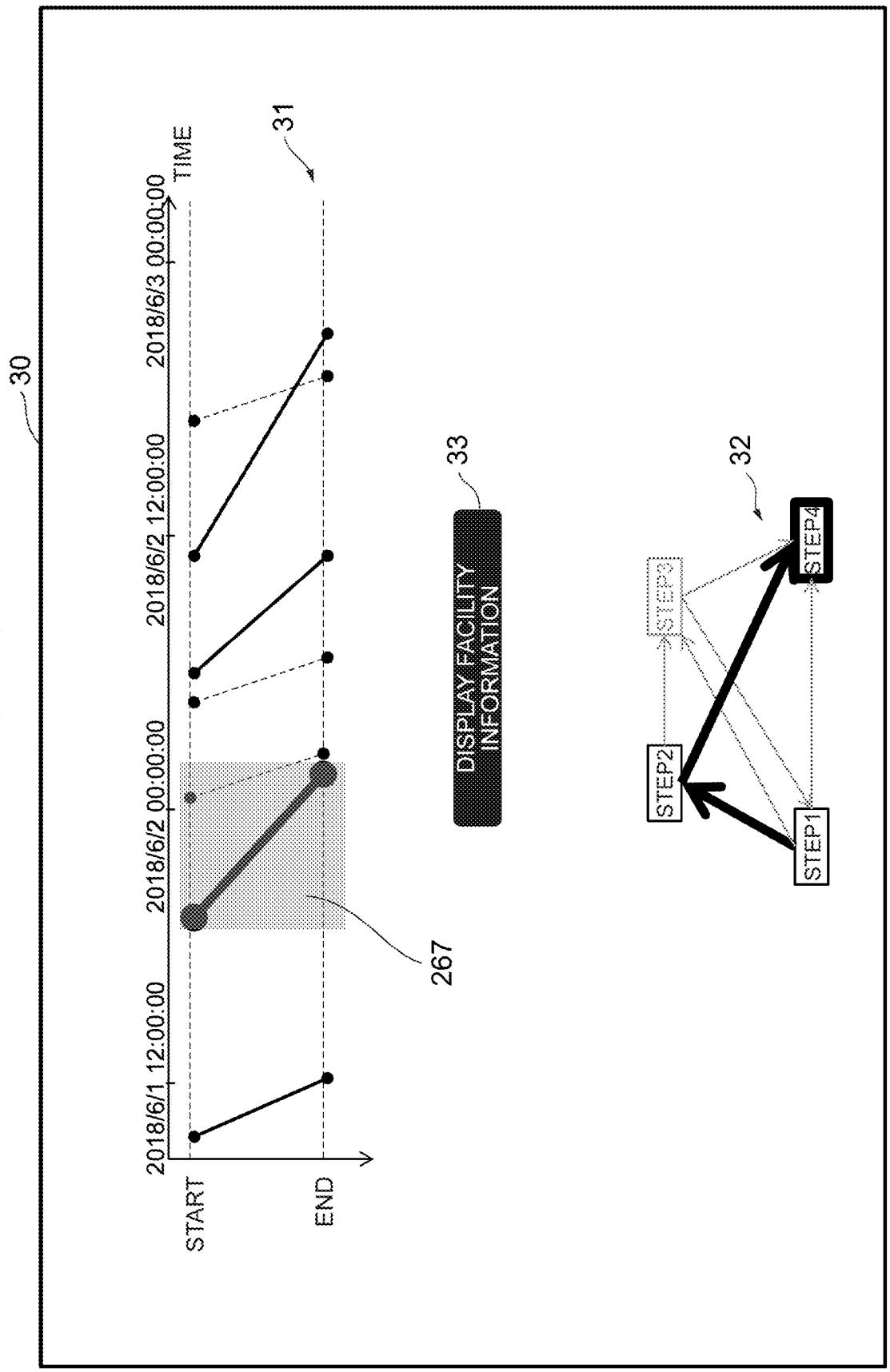
FIG. 19 shows an example of a lead time holistic UI.

When a model is selected after S1221 (S1222: Yes), the management server program 271 updates the display of the lead time holistic UI 30 in S1221. FIG. 18 shows an example of model selection. FIG. 19 shows an example of the UI 30 after the update. Note that, when the product view is selected, the management server program 271 may select a model from the plurality of models on the basis of the management information 272 (e.g., select a model in that the deviation between the actual lead time and the standard lead time (the actual lead time>the standard lead time) is the largest during the display target period), and display the lead time holistic UI 30 that provides a holistic view of the actual lead time for the selected model. Specifically, as an example, the UI 30 illustrated in FIG. 19 may be displayed without displaying the UI 30 illustrated in FIGS. 17 and 18.

Figure 20:
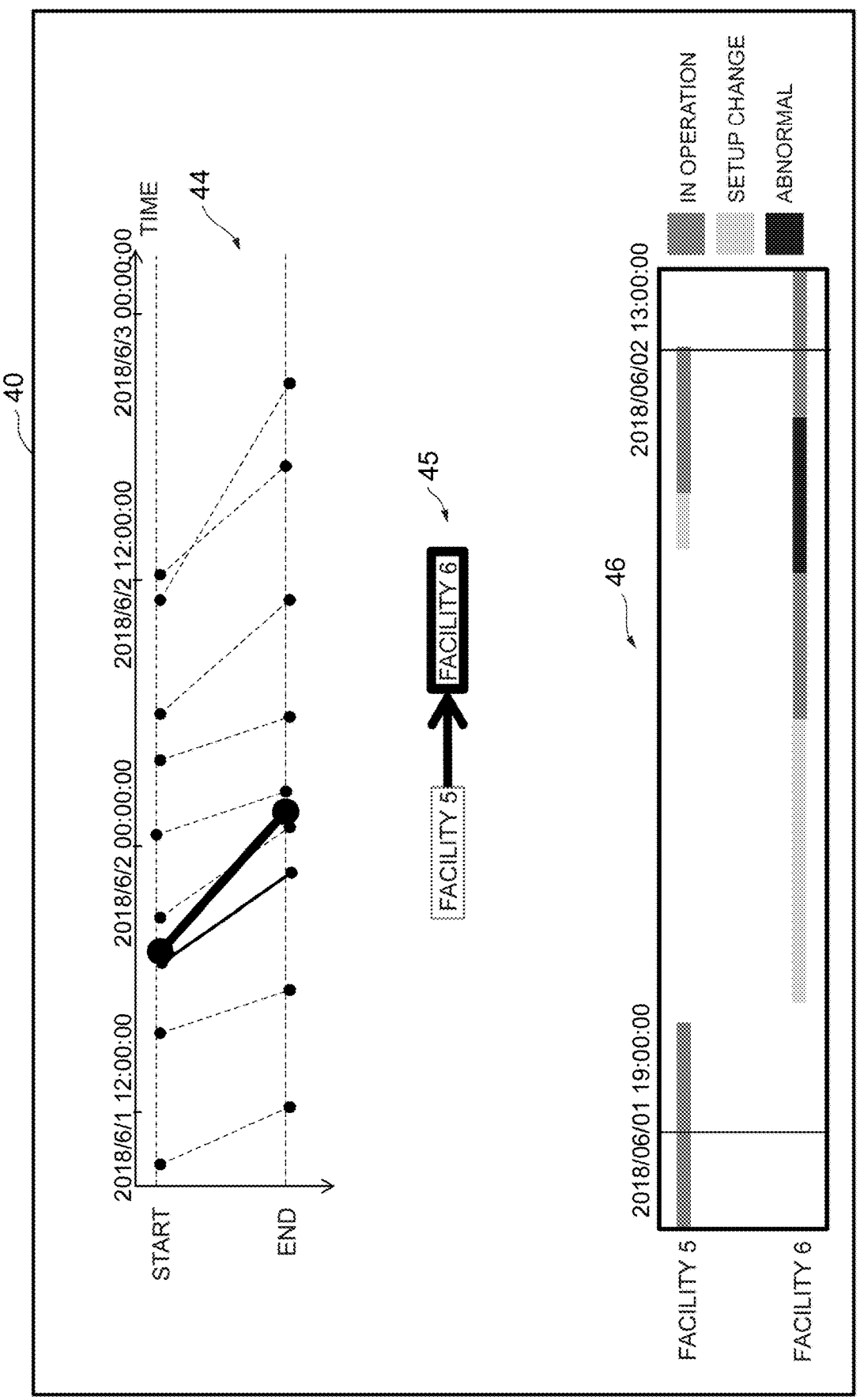
FIG. 20 shows an example of a facility UI.

After S1221 (e.g., after displaying the UI 30 that provides a holistic view of the actual lead time for the selected model), when receiving a selection of facility display (S1223: Yes), the management server program 271 displays the facility UI 40 (S1231). FIG. 20 shows an example of that UI 40.

For example, when a user operation other than model selection and facility display (e.g., a user operation to close the UI 30) is performed (S1223: No), the management server program 271 performs processing according to the user operation (S1224).

In the following, an example of a UI change in the processes of S1211 to S1231 and an example of a UI change in the processes of S1221 to S1231 will be described. Note that the threshold for the retention number is sometimes referred to as the "retention threshold". The threshold for the actual lead time is the standard lead time. The threshold for the partial actual lead time (a time actually required for an intra-step range) is the partial standard lead time (standard time).

Example of UI Change in Processes of S1211 to S1231

First, the retention holistic view UI 20 shown by way of example in FIG. 13 is displayed. The UI 20 provides a holistic view of the retention number in a state in which a plurality of models are mixed. The retention holistic UI 20 includes a retention holistic chart 21 (an example of a first holistic chart) that is a heat map having a time axis and shows the retention number at each date and time (time slice) for each step, an order-of-step chart 22 (an example of a second holistic chart) that is a directed graph in which a display object for each step is set as a node and a display object for each inter-step range is set as an edge, and a facility information display button 23 (e.g., a GUI object). In the UI 20 shown by way of example in FIG. 13, since a plurality of models are mixed (since the models are not narrowed down to, e.g., one), facility display is not possible, specifically, the facility information display button 23 is disabled (in a state in which the button cannot be pressed).

In the retention holistic chart 21, on a step axis (axis corresponding to steps) perpendicular to the time axis, the IDs of all steps 1 to 4 of the production system 200 are arranged, for example, in the order of steps 1 to 4. Also, on the step axis, starting and ending of each step are provided. In the example of FIG. 13, the time axis is the horizontal axis and the step axis is the vertical axis. However, the time axis may be the vertical axis and the step axis may be the horizontal axis.

In the retention holistic chart 21, the unit of the display object is a set of a time slice and an intra-step range or an inter-step range. In other words, the retention holistic chart 21 has a plurality of display objects arranged two-dimensionally along the time axis and the step axis. The display mode (e.g., color or density) of each display object depends on the retention number corresponding to the display object (e.g., the retention number specified from the retention number table 352 for each model (the total of the retention numbers of the plurality of models)). (Note that "the retention number corresponding to the display object" is the retention number associated with the time slice corresponding to the display object and the intra-step range or the inter-step range corresponding to the display object). The management server program 271 determines whether or not each display object in the retention holistic chart 21 is to be subjected to the accentuated display according to the retention number, and determines the level of the accentuated display when it is to be subjected to the accentuated display. For example, in the case where one or more retention thresholds are registered in the management information 272 for each model, the display mode of the display object corresponding to the retention number may be determined depending on which is the largest one of the retention thresholds that the retention number exceeds. The one or more retention thresholds may be set in each intra-step range or each inter-step range instead of or in addition to each model.

Even when a plurality of models are mixed, the retention holistic chart 21 as described above makes it easier to recognize the retention situation in each step (each intra-step range or each inter-step range) for each time slice during the display target period (e.g., in which date and time and which step the retention is a problem).

The order-of-step chart 22 is arranged in a direction perpendicular to the time axis direction (e.g., below the retention holistic chart 21) with respect to the retention holistic chart 21 that is long along the time axis direction. The order-of-step chart 22 shows a relationship between a plurality of steps on the flow of a plurality of different models of products. In the example of FIG. 13, since there is an edge (arrow) extending from the node "step 1" to the node "step 2", the step subsequent to step 1 is step 3 for at least one model. Also, in the example of FIG. 13, since there is no edge (arrow) extending from the node "step 2" to the node "step 1", the step subsequent to step 2 may be not step 1 for any model.

Each node and each edge in the order-of-step chart 22 are display objects that may be subjected to the accentuated display by the management server program 271. In the example in FIG. 13, since the retention number corresponding to the range in step 4 exceeds the retention threshold, the node "step 4" is subjected to the accentuated display (e.g., the frame line of the node "step 4" is bolded). Also, in the example of FIG. 13, since the retention number corresponding to each of the range in step 1 and the range in step 2 does not exceed the retention threshold, both the node "step 1" and the node "step 2" are subjected to the accentuated display. However, since the retention number corresponding to the inter-step range 1-2 exceeds the retention threshold, the edge corresponding to the inter-step range 1-2 (the edge extending from the node "step 1" to the node "step 2") is subjected to the accentuated display (e.g., the edge is turned to a thick line).

Even when a plurality of models are mixed, the order-of-step chart 22 described above makes it easier to recognize what kind of inter-step range is present and the retention situation in each step (each intra-step range or each inter-step range) during the entire display target period. In particular, viewing the retention holistic chart 21, which shows the retention situation for each time slice during the display target period, and the order-of-step chart 22, which is a directed graph showing the retention situation during the entire display target period together with the sequential order of the steps for each model, makes it more easier to recognize the throughput situation during the display target period. Note that the following, as examples, are true for the order-of-step chart 22 shown by way of example in FIG. 13:

Node "step 4" is subjected to the accentuated display. This means that the retention number corresponding to step 4 exceeds the retention threshold. Therefore, the user can guess that a problem occurs in step 4.

The edge "inter-step range 1-2" is subjected to the accentuated display, but the node "step 2" is not subjected to the accentuated display. This means that the number of products for which step 1 has been completed but step 2 has not yet started exceeds the retention threshold, but the retention number corresponding to step 2 is equal to or smaller than the retention threshold. Therefore, the user can guess that a problem occurs in the inter-step range 1-2 and no problem occurs in step 2.

Incidentally, an example of retention number calculation in the present embodiment may be as follows. On the basis of the step past record table 351 for each model, the feature value calculating portion 361 may calculate, for each of one or more times in the display target period (i.e., for each time slice), the number of products for which the previous step has not ended before that time but the step has not started at that time, for each model. For each time, the retention number may be, for example, as follows. The retention number calculated for each model is reflected in the retention number table 352.

The number of products calculated for a given model is the retention number in the inter-step range corresponding to the given model.

When an inter-step range is common among a plurality of models, the total of the retention numbers in the inter-step range for the respective models is the retention number in the inter-step range for the plurality of models.

When a step corresponding to a child node among a plurality of inter-step ranges (the later step of the inter-step range) is common among a plurality of models, the total of the retention numbers in the plurality of inter-step ranges may the retention number in the intra-step range of the corresponding step for the plurality of models. (According to the example of FIG. 13, the total of the retention number in the inter-step range 1-4, the retention number in the inter-step range 2-4, and the retention number in the inter-step range 3-4 may be the retention number in step 4).

In terms of each step for each model, the retention number in the intra-step range may include the number of products for which the step has started before the corresponding time but the step has not ended at that time.

Now, on the basis of the display of the retention holistic UI 20 shown by way of example in FIG. 13, at least one of a model selection (model narrowing) and a step selection (step narrowing) is performed. At least one of the model selection and the step selection may be any one of the following (1A) to (1C).

(1A) At least one of the model selection and the step selection may be performed without a selection operation by the user (i.e., automatically). For example, on the basis of a management information portion corresponding to a display range (display target period) in the retention holistic chart 21 (e.g., a portion belonging to the display target period in the retention number table 352), the management server program 271 specifies at least one of the model having the largest retention number and the step having the largest retention number, and selects the specified model or step. Note that "the largest retention number" may be the accumulated value of the retention numbers during the display target period, may be the accumulated value of the retention numbers exceeding the retention threshold during the display target period, or may be the longest duration during which the retention number exceeds the retention threshold in the display target period.

(1B) At least one of the model selection and the step selection may be performed in response to a selection operation on the retention holistic chart 21. This selection operation may be, for example, any one of the following:

Selection of a display object desired by the user (e.g., mouse click). In this case, the management server program 271 performs at least one of the selection of the step corresponding to the selected display object and the selection of all the models having the sequential order of the steps including that step (all the models specified from the order-of-step table 353).

Specification of a rectangular area 14 desired by the user (the shape of the area is not limited to a rectangle) (e.g., mouse dragging), as shown in FIG. 14. In this case, the management server program 271 specifies all the steps included in the rectangular area 14 and performs at least one of the selection of all the specified steps (or the step having the largest retention number among them) and the selection of all the models having the sequential order of the steps including all the specified steps (all the models (or the model having the largest retention number) specified from the order-of-step table 353).

(1C) At least one of the model selection and the step selection may be performed in response to a selection operation on the order-of-step chart 22. This selection operation may be, for example, any one of the following:

Selection of a node desired by the user (typically, the node subjected to the accentuated display) (e.g., mouse click). In this case, the management server program 271 performs at least one of the selection of the step corresponding to the selected node and the selection of all the models having the sequential order of the steps including that step (all the models specified from the order-of-step table 353).

Selection of an edge 15 desired by the user (typically, the edge subjected to the accentuated display), as shown by way of example in FIG. 14 (e.g., mouse click). In this case, the management server program 271 specifies the inter-step range corresponding to the selected edge 15, performs at least one of the selection of the steps of the specified inter-step range and the selection of all the models having the sequential order of the steps including the specified inter-step range (all the models specified from the order-of-step table 353).

When a model is selected according to any one of (1A) to (1C) (in the case where there are two or more models, after the models are narrowed down to one model), the management server program 271 specifies information for the selected model (in case where a display target period is narrowed down by specifying a rectangular area or the like, the narrowed-down display target period) from the management information 272 (e.g., the tables 351 to 353), and changes both of the display of the retention holistic chart 21 and the display of the order-of-step chart 22 to the display corresponding to the selected model on the basis of the specified information. For example, it is assumed that model Y is selected, and as a result, both of the display of the retention holistic chart 21 and the display of the order-of-step chart 22 are changed to the display shown by way of example in FIG. 15.

In the retention holistic chart 21 for model Y, steps are arranged on the step axis in the sequential order of the steps for model Y (the sequential order of the steps specified from the order-of-step table 353), and display objects showing the retention number for each time slice are arranged along the step axis.

In the order-of-step chart 22 for model Y, the display of nodes and edges other than the nodes and edges corresponding to model Y is relatively lightened. This makes it easier to recognize the sequential order of the steps for the selected model Y and makes it possible for the user to recognize the influence from the models other than model Y on the basis of the remaining display of the nodes and edges corresponding to the unselected models. Also, in the display of the order-of-step chart 22 after the change, although, on the sequential order of the steps, a display change is performed which results in a relatively low level of display of the display objects corresponding to the models other than model Y, on the retention number, the display corresponding to all the models is maintained (e.g., the accentuation of the edge corresponding to the inter-step range 3-4 is maintained). This makes it possible to recognize the retention situation corresponding to model Y from the retention holistic chart 21 and to recognize the influence from the models other than model Y from the order-of-step chart 22.

On the basis of the display of the retention holistic UI 20 (the UI 20 after the model selection) shown by way of example in FIG. 15, a step selection (step narrowing) is performed. The step selection may be any one of the following (1a) to (1c): The number of steps to be selected according to the step selection may be one or more.

(1a) The step selection may be performed without a selection operation by the user (i.e., automatically). For example, on the basis of a management information portion corresponding to a display range (display target period) in the retention holistic chart 21 (e.g., a portion belonging to the display target period in the retention number table 352), the management server program 271 specifies the step having the largest retention number and selects the specified step.

(1b) The step selection may be performed in response to a selection operation on the retention holistic chart 21. This selection operation may be, for example, any one of the following:

Selection of a display object desired by the user (e.g., mouse click). In this case, the management server program 271 selects a step corresponding to the selected display object.

Specification of a rectangular area 265 desired by the user (the shape of the area is not limited to a rectangle) (e.g., mouse dragging), as shown in FIG. 15. In this case, the management server program 271 specifies all the steps included in the rectangular area 265 overlaps (or the step with the largest retention number) and selects the specified step.

(1c) The step selection may be performed in response to a selection operation on the order-of-step chart 22. This selection operation may be, for example, any one of the following:

Selection of a node desired by the user (typically, the node subjected to the accentuated display) (e.g., mouse click). In this case, the management server program 271 selects the step corresponding to the selected node. One example is the selection of the node "step 4".

Selection of an edge desired by the user (typically, the edge subjected to the accentuated display) (e.g., mouse click). In this case, the management server program 271 specifies the inter-step range corresponding to the selected edge and selects both steps (or one step) of the specified inter-step range.

When a step is selected according to any one of (1a) to (1c), the management server program 271 changes the state of the facility information display button 23 to an enabled state (in a state in which the button can be pressed) as shown by way of example in FIG. 15. When the button 23 is pressed, the management server program 271 displays the facility UI 40 having information related to the facility belonging to the selected step. Note that the management server program 271 may display the facility UI 40 in response to the step selection according to any one of (1a) to (1c) without pressing the button 23. (In other words, the button 23 may be not provided in the UI 20).

Note that, as described above, for the UI 20 shown byway of example in FIG. 13, the step selection may be performed according to any one of (1A) to (1C) instead of the model selection. When the step selection is performed, the management server program 271 changes the state of the facility information display button 23 to an enabled state. When the button 23 is pressed, the management server program 271 displays the facility UI 40 having information related to the facility belonging to the selected step. Note that the management server program 271 may display the facility UI 40 in response to the step selection according to any one of (1A) to (1C) without pressing the button 23.

FIG. 16 shows an example of the facility UI 40. In the example of FIG. 16, the selected step is step 4 in any one of the examples of FIGS. 14 to 16.

The information displayed on the facility UI 40 is based on the facility performance table 354 and the order-of-facility table 355. The facility UI 40 has a facility heat map chart 41, an order-of-facility chart 42, and a facility Gantt chart 43 (one or some of the charts 41 to 43 may be eliminated). When there are two or more selected steps, each of the charts 41 to 43 may be provided for each step, or may have information for each step.

The facility heat map chart 41 is a heat map having a time axis and corresponding to the retention number for each facility at each date and time (time slice). In the facility heat map chart 41, the facility IDs (facility 5, facility 6) belonging to the selected step 4 are arranged on a facility axis (axis corresponding to facilities) perpendicular to the time axis. Also, on the facility axis, starting and ending of each facility are provided. In the example of FIG. 16, the time axis is the horizontal axis and the facility axis is the vertical axis. However, the time axis may be the vertical axis and the facility axis may be the horizontal axis.

In the facility heat map chart 41, the unit of the display object is a set of a time slice and a facility. In other words, the facility heat map chart 41 has a plurality of display objects arranged two-dimensionally along the time axis and the facility axis. The display mode (e.g., color or density) of each display object depends on the retention number corresponding to the display object (e.g., the retention number specified from the facility performance table 354). (Note that "the retention number corresponding to the display object" is the retention number associated with the time slice corresponding to the display object and the intra-facility range or the inter-facility range corresponding to the display object). The management server program 271 determines whether or not each display object in the facility heat map chart 41 is to be subjected to the accentuated display according to the retention number, and determines the level of the accentuated display when it is to be subjected to the accentuated display. For example, in the case where one or more retention thresholds are registered in the management information 272 on a per facility basis (or on a per set of model and facility basis), the display mode of the display object corresponding to the retention number may be determined depending on which is the largest one of the retention thresholds that the retention number exceeds.

The order-of-facility chart 42 is arranged in a direction perpendicular to the time axis direction (e.g., below the facility heat map chart 41) with respect to the facility heat map chart 41 that is long along the time axis direction. The order-of-facility chart 42 shows a relationship between the facilities 5 and 6 in the selected step 4. In the example of FIG. 16, since there is an edge (arrow) extending from the node "facility 5" to the node "facility 6", the product flows to facility 6 after facility 5 in step 4.

Each node and each edge in the order-of-facility chart 42 are display objects that may be subjected to the accentuated display by the management server program 271. In the example in FIG. 16, since the retention number corresponding to the range in facility 6 exceeds the retention threshold, the node "facility 6" is subjected to the accentuated display (e.g., the frame line of the node "facility 6" is bolded). Also, in the example of FIG. 16, since the retention number in the range in facility 5 does not exceed the retention threshold, the node "facility 5" is subjected to the accentuated display. However, since the retention number corresponding to the inter-facility range 5-6 exceeds the retention threshold, the edge corresponding to the inter-facility range 5-6 (the edge extending from the node "facility 5" to the node "facility 6") is subjected to the accentuated display (e.g., the edge is turned to a thick line).

The facility Gantt chart 43 shows that each facility is in which facility status and in which time block. In the facility Gantt chart 43, for example, the horizontal axis is the time axis, and the vertical axis is the facility axis. In the facility Gantt chart 43, the display object corresponding to the facility includes a display mode corresponding to the facility status of the facility, and a length (length along the time axis) corresponding to a duration during which the facility is in that facility status.

In the description of FIGS. 13 to 16, the drawing (or updating) of the retention holistic chart 21 may be performed, for example, in the following procedure:

(11-1) The management server program 271 analyzes the corresponding portion of the management information 272 corresponding to the display target period to specify a retention number for each time slice. The "corresponding portion" referred to here is, in the case where a model and a step are selected, a portion corresponding to all models and all steps, and is, in the case where at least one of a model and a step is selected, a portion corresponding to the selected model and/or the selected step.

(11-2) The management server program 271 determines, for each retention number, a display mode of the display object corresponding to the retention number on the basis of the analysis result of (11-1). For example, the management server program 271 determines, for each retention number exceeding the retention threshold, the level of accentuated display according to the retention number.

(11-3) The management server program 271 draws the retention holistic chart 21 in which a plurality of display objects are arranged two-dimensionally along the time axis and the step axis in accordance with the determination in (11-2).

(11-4) The management server program 271 performs (11-1) when at least one of a model and a step is selected on the basis of either the retention holistic chart 21 or the order-of-step chart 22.

In the description of FIGS. 13 to 16, the drawing (or updating) of the order-of-step chart 22 may be performed, for example, in the following procedure:

(12-1) The management server program 271 analyzes the corresponding portion of the management information 272 corresponding to the display target period to specify a relationship between a plurality of steps. The "corresponding portion" referred to here is, in the case where no model is selected, a portion corresponding to all models, and is, in the case where a model is selected, a portion corresponding to the selected model. Also, the "display target period" referred to here is a period specified by the user initially or in the process of drill town.

(12-2) The management server program 271 determines a display mode of each node and each edge on the basis of the analysis result of (12-1) and, for example, also the result of (11-1). For example, the management server program 271 determines that the display object (node or edge) corresponding to the retention number exceeding the retention threshold is to be subjected to the accentuated display. Also, for example, the management server program 271 determines that the display mode of the display objects (nodes or edges) corresponding to models other than the selected model is to be lighter than the display object corresponding to the selected model.

(12-3) the management server program 271 draws the order-of-step chart 22 in which the intra-step ranges are set as the nodes and the inter-step ranges are set as the edges in accordance with the determination in (12-2).

(12-4) The management server program 271 performs (12-1) when a model is selected on the basis of either the retention holistic chart 21 or the order-of-step chart 22.

In the description of FIGS. 13 to 16, the drawing of the facility heat map chart 41 may be performed, for example, in the following procedure:

(13-1) The management server program 271 analyzes the corresponding portion of the management information 272 corresponding to the display target period to specify a retention number for each time slice on a per facility basis. The "corresponding portion" referred to here is a selected step (or a step included in the sequential order of the steps corresponding to the selected model).

(13-2) The management server program 271 determines, for each retention number, a display mode of the display object corresponding to the retention number on the basis of the analysis result of (13-1). For example, the management server program 271 determines, for each retention number exceeding the retention threshold, the level of accentuated display according to the retention number.

(13-3) The management server program 271 draws the facility heat map chart 41 in which a plurality of display objects are arranged two-dimensionally along the time axis and the facility axis in accordance with the determination in (13-2).

In the description of FIGS. 13 to 16, the drawing of the order-of-facility chart 42 may be performed, for example, in the following procedure:

(14-1) The management server program 271 analyzes the corresponding portion of the management information 272 corresponding to the display target period to specify a relationship between facilities. The "corresponding portion" referred to here is a portion corresponding to the selected step.

(14-2) The management server program 271 determines a display mode of each node and each edge on the basis of the analysis result of (14-1) and, for example, also the result of (13-1). For example, the management server program 271 determines that the display object (node or edge) corresponding to the facility (intra-facility range or inter-facility range) having the retention number exceeding the retention threshold is to be subjected to the accentuated display.

(14-3) the management server program 271 draws the order-of-facility chart 42 in which the facilities (intra-facility ranges) are set as the nodes and the inter-facility ranges are set as the edges in accordance with the determination in (14-2).

In the description of FIGS. 13 to 16, the drawing of the facility Gantt chart 43 may be performed, for example, in the following procedure:

(15-1) The management server program 271 analyzes the corresponding portion of the management information 272 corresponding to the display target period to specify a relationship between facilities. The "corresponding portion" referred to here is a portion corresponding to the selected step. Also, in this analysis, which facility is in which facility status and in which period is specified.

(15-2) The management server program 271 determines a display mode according to the facility status of the facility on the basis of the analysis result of (15-1) and determines a length corresponding to a duration during which the facility is in that facility status.

(15-3) The management server program 271 draws the facility Gantt chart 43 in accordance with the determination in (15-2).

Example of UI Change in Processes of S1221 to S1231

First, the lead time holistic UI 30 shown by way of example in FIG. 17 is displayed. The UI 30 provides a holistic view of the actual lead time in a state in which a plurality of models are mixed. The lead time holistic UI 30 includes a lead time holistic chart 31 (an example of a first holistic chart) including straight lines showing the actual lead times for the respective products, and an order-of-step chart 32 (an example of a second holistic chart) that is a directed graph in which a display object for each step is set as a node and a display object for each inter-step range is set as an edge, and a facility information display button 33 (e.g., a GUI object). In the UI 30 shown by way of example in FIG. 17, since the plurality of models are mixed (since the models are not narrowed down to, for example, one), the facility information display button 33 is disabled.

In the lead time holistic chart 31, actual lead times of the plurality of products belonging to the plurality of models are mixed. In the chart 31, one straight line corresponds to one product. In the chart 31, the step axis (axis corresponding to steps) perpendicular to the time axis has starting of the top step in the sequential order of the steps and ending of the last step in the sequential order of the steps for any model. For this reason, for each model, the starting date and time of the top step for the product and the ending date and time of the last step for the product are connected by a straight line. In other words, the actual lead time is a time actually taken from the starting of the top step to the end of the last step. The straight line is an example of a display object. In the example of FIG. 17, the time axis is the horizontal axis and the step axis is the vertical axis. However, the time axis may be the vertical axis and the step axis may be the horizontal axis. Also, the actual lead time (and a partial actual lead time described later) may be represented by a line other than a straight line, for example, a polygonal line. (The same may be true for any of FIGS. 18 to 20).

In the lead time holistic chart 31, the display mode (e.g., color, density, or line width) of each straight line depends on the actual lead time of the product (e.g., a lot) corresponding to the straight line. The actual lead time is specified by the management server program 271 from the step past record table 351. The management server program 271 determines whether or not each straight line in the lead time holistic chart 31 is to be subjected to the accentuated display according to the actual lead time, and determines the level of the accentuated display when it is to be subjected to the accentuated display. For example, in the case where one or more deviation thresholds (thresholds for the deviation between the actual lead time and the standard lead time) are registered in the management information 272 for each model, the display mode of the straight line corresponding to the product requiring the actual lead time may be determined on the basis of which of the deviation thresholds is the largest one of deviation thresholds that the LT deviation, which is the deviation between the actual lead time and the standard lead time (the actual lead time>the standard lead time), exceeds. For each model, the standard lead time can be specified from the order-of-step table 353.

Even when a plurality of models are mixed and the standard lead time is different depending on each model, the lead time holistic chart 31 described above makes it easier to recognize the actual lead time situation during the display target period (e.g., for which product the actual lead time has a problem?).

Also, for each model, a sub LT deviation is obtained by the management server program 271 for each step (each intra-step range). For each model, the "sub LT deviation" indicates, for each step, a deviation between the partial actual lead time obtained for the step belonging to the model and the partial standard lead time (standard time) corresponding to the model and the step. (the partial actual lead time>the partial standard lead time). The partial actual lead time is a time actually taken in the step (intra-step range) and can be specified from the step past record table 351. The partial standard lead time can be specified from the order-of-step table 354.

The order-of-step chart 32 is arranged in a direction perpendicular to the time axis direction (e.g., below the lead time holistic chart 31) with respect to the lead time holistic chart 31 that is long along the time axis direction. The configuration of the order-of-step chart 32 is a directed graph similarly to the order-of-step chart 22 described above. In terms of the display target period, a sub LT deviation of each of one or more products is obtained for each model on a per step (intra-step range) basis. Therefore, one or more sub LT deviations are obtained for each step. For each step, the display mode of the node corresponding to the step depends on a value on the basis of one or more sub LT deviation obtained for the step. As that value, an average value or a maximum value of the sub LT deviation may be used, but in the present embodiment, an average value (hereinafter, referred to as a sub LT deviation average) is used. For example, in the case where one or more sub deviation thresholds (thresholds for the sub LT deviation average) are registered in the management information 272 for each step on a per model basis, the display mode of the node may be determined on the basis of which of the sub deviation thresholds is the largest one of sub deviation thresholds that the sub LT deviation average exceeds. When the same step belongs to two or more models, the display mode of the node corresponding to the step may be determined on the basis of, for example, at least one of: the number of sub LT deviation averages that exceed the sub deviation threshold out of two or more sub LT deviation averages corresponding respectively to the two or more models; and whether or not a value based on the two or more sub LT deviation averages (e.g., an average value or a maximum value) exceeds the sub deviation threshold. Note that the display mode of each edge depends on one or more LT deviations calculated for a model to which the inter-step range corresponding to the edge belongs (one or more LT deviations corresponding respectively to one or more products belonging to the model). For example, the display mode of each edge may be as follows. Specifically, for each model, the management server program 271 calculates a value based on one or more LT deviations obtained respectively for one or more products belonging to the model. As that value, an average value or a maximum value of the LT deviation may be used, but in the present embodiment, an average value (hereinafter, referred to as an LT deviation average) is used. For example, in the case where one or more deviation thresholds are registered in the management information 272 on a per model basis, the display mode of the edge corresponding to each inter-step range belonging to the model may be determined on the basis of which of the deviation thresholds is the largest one of deviation thresholds that the LT deviation average exceeds. Also, when the same inter-step range belongs to two or more models, the display mode of the edge corresponding to the inter-step range may be determined on the basis of at least one of: an LT deviation average that exceeds the deviation threshold out of two or more LT deviation averages corresponding respectively to the two or more models; and whether or not a value based on the two or more LT deviation averages (e.g., an average value or a maximum value) exceeds the deviation threshold.

Even when a plurality of models are mixed, the order-of-step chart 32 described above makes it easier to recognize what kind of inter-step range is present and the actual lead time situation and partial actual lead time situation during the entire display target period. In particular, viewing the lead time holistic chart 31, which shows the actual lead time situation for each time slice during the display target period, and the order-of-step chart 32, which is a directed graph showing the actual lead time situation and the partial actual lead time situation during the entire display target period together with the sequential order of the steps for each model, makes it more easier to recognize the throughput situation during the display target period. Note that the following, as examples, are true for the order-of-step chart 32 shown by way of example in FIG. 17:

Node "step 4" is subjected to the accentuated display. This means that the sub LT deviation average corresponding to step 4 exceeds the sub deviation threshold. Therefore, the user can guess that a problem occurs in step 4.

Each edge belonging to the sequential order of the steps: step 1->step 2->step 4 is subjected to the accentuated display. This means that the LT deviation average corresponding to model Y (see FIG. 6) corresponding to the sequential order of the steps exceeds the deviation threshold. Therefore, the user can guess that a problem occurs in the throughput of model Y.

Now, on the basis of the display of the lead time holistic UI 30 shown by way of example in FIG. 17, at least one of a model selection and a step selection is performed. At least one of the model selection and the step selection may be any one of the following (2A) to (2C).

(2A) At least one of the model selection and the step selection may be performed without a selection operation by the user (i.e., automatically). For example, the management server program 271 specifies at least one of a model and a step to which the product having the largest LT deviation belongs, on the basis of the management information portion corresponding to the display range (display target period) of the lead time holistic chart 31, and selects the specified model or step.

(2B) At least one of the model selection and the step selection may be performed in response to a selection operation on the lead time holistic chart 31. This selection operation may be, for example, any one of the following:

Selection of a straight line desired by the user (typically, the straight line subjected to the accentuated display) (e.g., mouse click). In this case, the management server program 271 performs at least one of a selection of the model to which the product corresponding to the selected straight line belongs and a selection of a step of the sequential order of the steps for the model.

Specification of a rectangular area 266 desired by the user (the shape of the area is not limited to a rectangle) (e.g., mouse dragging), as shown in FIG. 18. In this case, the management server program 271 specifies all the straight lines included in the rectangular area 266, and performs, for each of all the specified straight lines, at least one of a selection of the model to which the product corresponding to that straight line belongs and a selection of an edge of the sequential order of the steps for the model.

(2C) At least one of the model selection and the step selection may be performed in response to a selection operation on the order-of-step chart 32. This selection operation may be, for example, any one of the following:

Selection of a node desired by the user (typically, the node subjected to the accentuated display) (e.g., mouse click). In this case, the management server program 271 performs at least one of the selection of the step corresponding to the selected node and the selection of all the models having the sequential order of the steps including that step (all the models specified from the order-of-step table 353).

Selection of an edge 269 desired by the user (typically, the edge subjected to the accentuated display), as shown by way of example in FIG. 18 (e.g., mouse click). In this case, the management server program 271 specifies the inter-step range corresponding to the selected edge 269, performs at least one of the selection of the steps of the specified inter-step range and the selection of all the models having the sequential order of the steps including the specified inter-step range (all the models specified from the order-of-step table 353).

When a model is selected according to any one of (2A) to (2C) (in the case where there are two or more models, after the models are narrowed down to one model), the management server program 271 specifies information for the selected model (in case where a display target period is narrowed down by specifying a rectangular area or the like, the narrowed-down display target period) from the management information 272 (e.g., the tables 351 to 353), and changes both of the display of the lead time holistic chart 31 and the display of the order-of-step chart 32 to the display corresponding to the selected model on the basis of the specified information. For example, it is assumed that model Y is selected, and as a result, both of the display of the lead time holistic chart 31 and the display of the order-of-step chart 22 are changed to the display shown by way of example in FIG. 19.

In the lead time holistic chart 31 corresponding to model Y, straight lines corresponding to the product belonging to model Y remain, and straight lines corresponding to products belonging to models other than model Y is not displayed.

In the order-of-step chart 32 for model Y, the display of nodes and edges other than the nodes and edges corresponding to model Y is relatively lightened. In the display of the order-of-step chart 32 after the change, although, on the sequential order of the steps, a display change is performed which results in a relatively low level of display of the display objects corresponding to the models other than model Y, on the LT deviation average and the sub LT deviation average, the display corresponding to all the models is maintained. This makes it possible to recognize the lead time situation corresponding to model Y from the lead time holistic chart 31 and to recognize the influence from the models other than model Y from the order-of-step chart 32.

On the basis of the display of the lead time holistic UI 30 (the UI 30 after the model selection) shown by way of example in FIG. 19, a step selection (step narrowing) is performed. The step selection may be any one of the following (2a) to (2c): The number of steps to be selected according to the step selection may be one or more.

(2a) The step selection may be performed without a selection operation by the user (i.e., automatically). For example, the management server program 271 specifies the steps of the sequential order of the steps corresponding to the model to which the product having the largest LT deviation belongs, on the basis of the management information portion corresponding to the display range (display target period) of the lead time holistic chart 31, and selects the specified steps.

(2b) The step selection may be performed in response to a selection operation on the lead time holistic chart 31. This selection operation may be, for example, any one of the following:

Selection of a straight line desired by the user (typically, the straight line subjected to the accentuated display) (e.g., mouse click). In this case, the management server program 271 specifies the steps of the sequential order of the steps corresponding to the model to which the product corresponding to the selected straight line belongs, and selects the specified steps.

Specification of a rectangular area 267 desired by the user (the shape of the area is not limited to a rectangle) (e.g., mouse dragging), as shown in FIG. 19. In this case, the management server program 271 specifies all the straight lines included in the rectangular area 267, and selects, for each of all the specified straight lines, the steps of the sequential order of the steps corresponding to the model to which the product corresponding to that straight line belongs.

(2c) The step selection may be performed in response to a selection operation on the order-of-step chart 32. This selection operation may be, for example, any one of the following:

Selection of a node desired by the user (typically, the node subjected to the accentuated display) (e.g., mouse click). In this case, the management server program 271 selects the step corresponding to the selected node.

Selection of an edge desired by the user (typically, the edge subjected to the accentuated display) (e.g., mouse click). In this case, the management server program 271 specifies the inter-step range corresponding to the selected edge and selects both steps (or one step) of the specified inter-step range.

When a step is selected according to any one of (2a) to (2c), the management server program 271 changes the state of the facility information display button 33 to an enabled state as shown by way of example in FIG. 19. When the button 33 is pressed, the management server program 271 displays the facility UI 40 having information related to the facility belonging to the selected step. Note that the management server program 271 may display the facility UI 40 in response to the step selection according to any one of (2a) to (2c) without pressing the button 33. (In other words, the button 23 may be not provided in the UI 30).

Note that, as described above, for the UI 30 shown byway of example in FIG. 17, the step selection may be performed according to any one of (2A) to (2C) instead of the model selection. When the step selection is performed, the management server program 271 changes the state of the facility information display button 33 to an enabled state. When the button 33 is pressed, the management server program 271 displays the facility UI 40 having information related to the facility belonging to the selected step. Note that the management server program 271 may display the facility UI 40 in response to the step selection according to any one of (2A) to (2C) without pressing the button 33.

FIG. 20 shows an example of the facility UI 40. In the example of FIG. 20, the selected step is step 4 in any one of the examples of FIGS. 17 to 19.

The information displayed on the facility UI 40 is based on the facility performance table 354 and the order-of-facility table 355. The facility UI 40 has a standard time chart 44, an order-of-facility chart 45, and a facility Gantt chart 46 (one or some of the charts 44 to 46 may be eliminated). When there are two or more selected steps, each of the charts 44 to 46 may be provided for each step, or may have information for each step.

The standard time chart 44 has a time axis, and represents the actual facility lead time that is a time required for each product in the facility by a straight line. In the standard time chart 44, on a facility axis (axis corresponding to facilities) perpendicular to the time axis, start and end are provided regardless of the facility. In the example of FIG. 20, the time axis is the horizontal axis and the facility axis is the vertical axis. However, the time axis may be the vertical axis and the facility axis may be the horizontal axis.

In the standard time chart 44, the display mode (e.g., color, density, or line width) of each straight line depends on the partial actual lead time (actual working time in step 4) of the product corresponding to the straight line. The management server program 271 determines whether or not each straight line in the standard time chart 44 is to be subjected to the accentuated display according to the partial actual lead time, and determines the level of the accentuated display when it is to be subjected to the accentuated display. In the example of FIG. 20, since the level of accentuation of one straight line is the highest, it can be seen that the partial actual lead time for step 4 of the product corresponding to that straight line greatly exceeds a partial standard lead time of "3600" for step 4 (see FIG. 8).

The order-of-facility chart 45 is arranged in a direction perpendicular to the time axis direction (e.g., below the standard time chart 44) with respect to the standard time chart 44 that is long along the time axis direction. The configuration of the order-of-facility chart 45 is the same as the configuration of the order-of-facility chart 42 described above. The display mode of the node depends on the facility actual lead time of the facility corresponding to that node, and the display mode of the edge depends on the partial actual lead time situation of step 4 (one example of the selected step) (e.g., the sub LT deviation average). In the example in FIG. 20, since the facility LT deviation for the range in facility 6 exceeds the facility deviation threshold, the node "facility 6" is subjected to the accentuated display (e.g., the frame line of the node "facility 6" is bolded). Also, in the example of FIG. 20, since the facility LT deviation for the range in facility 5 does not exceed the facility deviation threshold, the node "facility 5" is subjected to the accentuated display. However, since the sub LT deviation average corresponding to step 4 exceeds the sub deviation threshold, the edge corresponding to the inter-facility range 5-6 (the edge extending from the node "facility 5" to the node "facility 6") is subjected to the accentuated display (e.g., the edge is turned to a thick line). Note that, for each facility, the "facility LT deviation" may be, for each product loaded in the facility, a deviation between the facility actual lead time (a time actually required by the facility) and the facility standard lead time of the product (see FIG. 8) (the actual facility lead time>the facility standard lead time). For each facility, the management server program 271 may calculate a value (e.g., an average value or a maximum value) based on one or more facility LT deviations corresponding respectively to one or more products loaded in the facility. The "value based on one or more facility LT deviations" is, for example, an average value of one or more facility LT deviations (hereinafter, referred to as a facility LT deviation average). One or more facility deviation thresholds may be registered in the management information 272 on a per facility basis (or on a per set of model and facility basis). The "facility deviation threshold" may be a threshold for the facility LT deviation average. For each facility, the display mode of the node corresponding to the facility for which the facility LT deviation average has been calculated may be determined depending on which of the facility deviation thresholds that the facility LT deviation average exceeds is the largest.

The facility Gantt chart 46 is the same as the facility Gantt chart 43 described above, i.e., shows that each facility is in which facility status and in which time block.

In the description of FIGS. 17 to 20, the drawing (or updating) of the lead time holistic chart 31 may be performed, for example, in the following procedure:

(21-1) The management server program 271 analyzes the corresponding portion of the management information 272 corresponding to the display target period to calculate an LT deviation of each product. The "corresponding portion" referred to here is, in the case where a model and a step are selected, a portion corresponding to all models and all steps, and is, in the case where at least one of a model and a step is selected, a portion corresponding to the selected model and/or the selected step.

(21-2) The management server program 271 determines, for each product, a display mode of the straight line corresponding to the LT deviation of the product on the basis of the analysis result of (21-1). For example, the management server program 271 determines the level of accentuation depending on the LT deviation exceeding the LT deviation threshold.

(21-3) The management server program 271 draws the lead time holistic chart 31 in which a plurality of straight lines are arranged along the time axis in accordance with the determination in (21-2).

(21-4) The management server program 271 performs (21-1) when at least one of a model and a step is selected on the basis of either the lead time holistic chart 31 or the order-of-step chart 32.

In the description of FIGS. 17 to 20, the drawing (or updating) of the order-of-step chart 32 may be performed, for example, in the following procedure:

(22-1) The management server program 271 analyzes the corresponding portion of the management information 272 corresponding to the display target period to specify a relationship between a plurality of steps. The "corresponding portion" referred to here is, in the case where no model is selected, a portion corresponding to all models, and is, in the case where a model is selected, a portion corresponding to the selected model. Also, the "display target period" referred to here is a period specified by the user initially or in the process of drill town.

(22-2) The management server program 271 determines a display mode of each node and each edge on the basis of the analysis result of (22-1) and, for example, also the result of (21-1). For example, the management server program 271 determines that the node corresponding to the step (intra-step range) for which a sub LT deviation average exceeding the sub deviation threshold is obtained is to be subjected to the accentuated display. Also, for example, the management server program 271 determines that the edge corresponding to each step belonging to the model for which an LT deviation average exceeding the LT deviation threshold is obtained is to be subjected to the accentuated display. Also, for example, the management server program 271 determines that the display mode of the display objects (nodes or edges) corresponding to models other than the selected model is to be lighter than the display object corresponding to the selected model.

(22-3) the management server program 271 draws the order-of-step chart 32 in which the intra-step ranges are set as the nodes and the inter-step ranges are set as the edges in accordance with the determination in (22-2).

(22-4) The management server program 271 performs (22-1) when a model is selected on the basis of either the lead time holistic chart 31 or the order-of-step chart 32.

In the description of FIGS. 17 to 20, the drawing of the standard time chart 44 may be performed, for example, in the following procedure:

(23-1) The management server program 271 analyzes the corresponding portion of the management information 272 corresponding to the display target period to calculate a sub LT deviation of each product. The "corresponding portion" referred to here is a selected step (or a step included in the sequential order of the steps corresponding to the selected model).

(23-2) The management server program 271 determines a display mode of a straight line corresponding to each product on the basis of the analysis result of (23-1). For example, the management server program 271 determines the level of the accentuated display depending on the sub LT deviation for each product for which the sub LT deviation exceeding the sub deviation threshold is calculated.

(23-3) The management server program 271 draws the standard time chart 44 in which a plurality of straight lines are arranged along the time axis in accordance with the determination in (23-2).

In the description of FIGS. 17 to 20, the drawing of the order-of-facility chart 45 may be performed, for example, in the following procedure:

(24-1) The management server program 271 analyzes the corresponding portion of the management information 272 corresponding to the display target period to specify a relationship between facilities. The "corresponding portion" referred to here is a portion corresponding to the selected step.

(24-2) The management server program 271 determines a display mode of each node and each edge on the basis of the analysis result of (24-1) and, for example, also the result of (23-1). For example, the management server program 271 determines that the node corresponding to the facility (intra-facility range) for which the facility LT deviation average exceeding the facility deviation threshold has been calculated is to be subjected to the accentuated display. Also, for example, the management server program 271 determines a display mode of the edge corresponding to each facility belonging to the step depending on whether or not the sub LT deviation average corresponding to the step exceeds the sub deviation threshold.

(24-3) The management server program 271 draws the order-of-facility chart 45 in which the intra-facility ranges are set as the nodes and the inter-facility ranges are set as the edges in accordance with the determination in (24-2).

In the description of FIGS. 17 to 20, the drawing of the facility Gantt chart 46 may be performed, for example, according to the procedure in the description of FIGS. 13 to 16 (i.e., (15-1) to (15-3)).

The foregoing is the description of the present embodiment. Note that the facility is an example of a step element, as described above. In at least one step, a step element (e.g., a worker) other than the facility may be adopted instead of or in addition to the facility. Also, the display mode of at least one display object may be determined on the basis of whether or not the display object is to be subjected to the accentuated display, and it is not necessary to determine the level of accentuation in the case of accentuated display. In other words, for at least one display object, it is not necessary to calculate a deviation between the past record value and the threshold therefor. As an example, at least one of the following may be adopted.

UI Change in Processes of S1211 to S1231

At least one of the retention holistic chart 21, the order-of-step chart 22, the facility heat map chart 41, and the order-of-facility chart 42 may be, for example, as follows. For each display object, when the retention number corresponding to the display object exceeds the retention threshold corresponding to the display object, the management server program 271 may determine that the display object is to be subjected to the accentuated display.

UI Change in Processes of S1221 to S1231

The lead time holistic chart 31 may be, for example, as follows. For each straight line, when the actual lead time of the product corresponding to the straight line exceeds the standard lead time corresponding to the model to which the product belongs, the management server program 271 may perform accentuated display of the straight line.

The order-of-step chart 32 may be, for example, as follows. For each node, when the partial actual lead time of the step corresponding to the node (e.g., a value based on one or more partial actual lead times corresponding respectively to one or more products passing through the step) exceeds the partial standard lead time corresponding to the step, the management server program 271 may perform accentuated display of the node. Also, for each edge, when the actual lead time of the model to which the inter-step range corresponding to the edge belongs (e.g., a value based on one or more actual lead times corresponding respectively to one or more products belonging to the model) exceeds the standard lead time corresponding to the model, the management server program 271 may perform accentuated display of the edge.

The standard time chart 44 may be, for example, as follows. For each straight line, when the actual lead time of the selected step for the product corresponding to the straight line exceeds the partial standard lead time corresponding to the step, the management server program 271 may perform accentuated display of the straight line.

The order-of-facility chart 45 may be, for example, as follows. For each node, when the facility actual lead time of the facility corresponding to the node (e.g., a value based on one or more facility actual lead times corresponding respectively to one or more products passing through the facility) exceeds the facility standard lead time corresponding to the facility, the management server program 271 may perform accentuated display of the node. Also, for each edge, when the partial actual lead time of the step to which the inter-facility range corresponding to the edge belongs (e.g., a value based on one or more partial actual lead times corresponding respectively to one or more products passing through the step) exceeds the partial standard lead time corresponding to the step, the management server program 271 may perform accentuated display of the edge.

The above description can be summarized, for example, as follows.

The support program 150 displays, on the basis of management information 272 including information as a past record which shows, for each product loaded in a production system in which a plurality of different models of products are loaded and a sequential order of two or more of a plurality of steps is different depending on the model, an execution time of each of the steps, at least one of a first holistic chart (e.g., the retention holistic chart 21 or the lead time holistic chart 31) and a second holistic chart (e.g., the order-of-step chart 22). The first holistic chart is a user interface which has a time axis that is an axis corresponding to time and in which display objects that each show a feature value of production situation of a product during a display target period on a per predetermined unit basis are arranged. The second holistic chart is a user interface which shows a relationship between the plurality of steps with respect to a flow of the plurality of different models of products and in which display objects for respective steps and display objects for respective inter-step ranges are arranged. In both the first holistic chart and the second holistic chart, a display object corresponding to a feature value satisfying a condition (e.g., a retention number exceeding a retention threshold or an actual lead time exceeding a standard lead time) is subjected to accentuated display. The support program 150 selects at least one of a model and a step with respect to either the first holistic chart or the second holistic chart. The selection may be performed automatically as described above, or may be performed in response to a selection operation from a user. The support program 150 displays, on the basis of the management information 272, step element information (e.g., the facility UI 40) including at least one of information related to one or more step elements of one or more steps belonging to the selected model and information related to one or more step elements of the selected one or more steps.

Preferably, the support program 150 displays both the first holistic chart and the second holistic chart.

The second holistic chart may be a graph in which a display object for each step is set as a node and a display object for each inter-step range is set as an edge. The graph may be a directed graph. In at least one inter-step range, when there is a model for which a product flows from a first step to a second step and a model for which a product flows from the second step to the first step, the second holistic chart (directed graph) may include both a display object serving as an edge extending from the first step to the second step and a display object serving as an edge extending from the second step to the first step.

The first holistic chart is one or both of the retention holistic chart 21 that is a heat map having a time axis and corresponding to a retention number at each time for each step, and the lead time holistic chart 31 including a line showing an actual lead time for each product. The support program 150 may receive a selection as to whether to survey the production situation in the production system 200 in a time view or a product view. When the selection of the time view is received, the retention holistic chart 21 may be displayed. When the selection of the product view is received, the lead time holistic chart 31 may be displayed.

The step element information (e.g., the facility UI 40) displayed through the retention holistic chart 21 may include a heat map (e.g., the facility heat map chart 41) having a time axis and corresponding to a retention number at each time for each of one or more step elements. On the other hand, the step element information displayed through the lead time holistic chart 31 includes a chart (e.g., the standard time chart 44) including a line having a time axis and showing an actual lead time of each of the one or more step elements (i.e., a time actually taken by the step element).

Each of the step element information displayed through the retention holistic chart 21 and the step element information displayed through the lead time holistic chart 31 may include at least one of a graph showing a relationship between one or more step elements (e.g., the order-of-facility charts 42 or 45) and a Gantt chart showing the work situation of one or more step elements (e.g., the facility Gantt chart 43 or 46).

The support program 150 may select a model for either the first holistic chart or the second holistic chart, change the display of the first holistic chart to a display corresponding to the selected model, and change the display of the second holistic chart to a display in which a display mode of display objects for models other than the selected model is lighter than a display mode corresponding to the selected model. When a selection for display related to a step element is received for one of the first and second holistic charts after the change, the support program 150 may display the step element information including information related to one or more step elements of one or more steps belonging to the selection on the basis of the management information 272.

While the embodiment of the present invention has been described heretofore, the embodiment is an example for describing the present invention and is not intended to limit the scope of the present invention to the embodiment. The present invention can be implemented even in various other forms.

What is claimed is:

1. A production management supporting system, comprising:
   an interface portion including one or more interfaces;
   a storing portion including one or more memories, the storing portion storing management information that includes information as a past record which shows, for each product loaded in a production system in which a plurality of different models of products are loaded and a sequential order of two or more of a plurality of steps is different depending on the model, an execution time of each of the steps and order-of-steps information that includes information of the sequential order of a plurality of steps for each of the plurality of models; and
   a processor portion coupled to the interface portion and to the storing portion, wherein
   the processor portion displays a holistic chart that is a second holistic chart, or both a first holistic chart and the second holistic chart,
   the first holistic chart is a user interface which is created on the basis of the management information and has a time axis that is an axis corresponding to time and in which display objects that each show a feature value of production situation of a product during a display target period on a per predetermined unit basis are arranged,
   the second holistic chart is a user interface which is created on the basis of the management information and the order-of-steps information and in which a directed graph is indicated, showing a sequential order relationship between the plurality of steps with respect to a flow of the plurality of different models of products and including display objects indicating steps as nodes and indicating inter-step ranges as edges,
   in both the first holistic chart and the second holistic chart, a display object corresponding to a feature value satisfying a condition is subjected to accentuated display,
   when the processor portion selects a model with respect to the first holistic chart, the processor displays only a display object corresponding to the selected model, and
   when the processor portion selects a model with respect to the second holistic chart, the processor portion displays, in the second holistic chart, a display object indicating a sequential order relationship between a plurality of steps corresponding to the selected model on the basis of the order of steps information.

2. The production management supporting system according to claim 1, wherein regarding the graph, in at least one inter-step range, when there are models for which a product flows from a first step to a second step and a model for which a product flows from the second step to the first step, the second holistic chart includes both a display object serving as an edge extending from the first step to the second step and a display object serving as an edge extending from the second step to the first step.

3. The production management supporting system according to claim 1, wherein the first holistic chart is a retention holistic chart that is a heat map having a time axis and corresponding to a retention number at each time for each step.

4. The production management supporting system according to claim 1, wherein the first holistic chart is a lead time holistic chart including a line showing an actual lead time for each product.

5. The production management supporting system according to claim 1, wherein the processor portion:
   receives a selection as to whether to survey the production situation in the production system in one of a time view and a product view,
   displays, when selection of the time view is received, a retention holistic chart that is a heat map having a time axis and corresponding to a retention number at each time for each step as the first holistic chart, and
   displays, when selection of the product view is received, a lead time holistic chart including a line showing an actual lead time for each product as the first holistic chart.

6. The production management supporting system according to claim 5, wherein
   the processor portion displays, on the basis of the management information, step element information including at least one of information related to one or more step elements of one or more steps belonging to the selected model and information related to one or more step elements of the selected one or more steps,
   the step element information displayed through the retention holistic chart includes a heat map having a time axis and corresponding to a retention number at each time for each of the one or more step elements, and
   the step element information displayed through the lead time holistic chart includes a chart having a time axis and including a line showing a time actually taken in the step element for each of the one or more step elements.

7. The production management supporting system according to claim 6, wherein each of the step element information displayed through the retention holistic chart and the step element information displayed through the lead time holistic chart include at least one of a graph showing a relationship between the one or more step elements and a Gantt chart showing work situation of the one or more step elements.

8. A product management supporting method, comprising the steps of:
- displaying, as a past record which shows, for each product loaded in a production system in which a plurality of different models of products are loaded and a sequential order of two or more of a plurality of steps is different depending on the model, an execution time of each of the steps, a holistic chart that is a second holistic chart, or both a first holistic chart and the second holistic chart,
- the first holistic chart being a user interface which is created on the basis of the management information and has a time axis that is an axis corresponding to time and in which display objects that each show a feature value of production situation of a product during a display target period on a per predetermined unit basis are arranged,
- the second holistic chart being a user interface which is created on the basis of the management information and the order-of-steps information and in which a directed graph is indicated showing a sequential order relationship between the plurality of steps with respect to a flow of the plurality of different models of products and including display objects indicating steps as nodes and indicating inter-step ranges as edges,
- in both the first holistic chart and the second holistic chart, a display object corresponding to a feature value satisfying a condition being subjected to accentuated display;
- selecting a model for the first holistic chart and displaying only a display object corresponding to the selected model,
- selecting a model with respect to the second holistic chart, and displaying, in the second holistic chart, a display object indicating a sequential order relationship between a plurality of steps corresponding to the selected model on the basis of the order of steps information.

9. A non-transitory computer readable storage medium storing computer readable instructions which when executed by one or more processors, causes the one or more processors to perform the steps of:
- displaying, as a past record which shows, for each product loaded in a production system in which a plurality of different models of products are loaded and a sequential order of two or more of a plurality of steps is different depending on the model, an execution time of each of the steps, a holistic chart that is a second holistic chart, or both a first holistic chart and the second holistic chart,
- the first holistic chart being a user interface which is created on the basis of the management information an has a time axis that is an axis corresponding to time and in which display objects that each show a feature value of production situation of a product during a display target period on a predetermined unit basis are arranged,
- the second holistic chart being a user interface which is created on the basis of the management information and the order-of-steps information and in which a directed graph is indicating showing a sequential order relationship between the plurality of steps with respect to a flow of the plurality of different models of products and including display objects indicating steps as nodes and indicating inter-step ranges as edges;
- selecting a model for the first holistic chart and displaying only a display object corresponding to the selected model,
- selecting a model with respect to the second holistic chart, and displaying, in the second holistic chart, a display object indicating a sequential order relationship between a plurality of steps corresponding to the selected model on the basis of the order of steps information.

* * * * *